(12) United States Patent
Matsumoto

(10) Patent No.: US 10,488,633 B2
(45) Date of Patent: Nov. 26, 2019

(54) IMAGING LENS AND IMAGE CAPTURING DEVICE

(71) Applicant: Nikon Corporation, Minato-ku, Tokyo (JP)

(72) Inventor: Miho Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 208 days.

(21) Appl. No.: 15/632,312

(22) Filed: Jun. 24, 2017

(65) Prior Publication Data

US 2017/0293116 A1   Oct. 12, 2017

Related U.S. Application Data

(63) Continuation of application No. PCT/JP2015/000090, filed on Jan. 9, 2015.

(51) Int. Cl.
*G02B 9/60* (2006.01)
*G02B 13/02* (2006.01)
(Continued)

(52) U.S. Cl.
CPC ............ *G02B 13/02* (2013.01); *G02B 5/126* (2013.01); *G02B 13/0045* (2013.01);
(Continued)

(58) Field of Classification Search
CPC .... G02B 13/02; G02B 5/126; G02B 13/0045; G02B 13/18; G02B 13/0015
See application file for complete search history.

(56) References Cited

U.S. PATENT DOCUMENTS

| 4,458,991 A | 7/1984 | Yamada |
| 4,699,477 A | 10/1987 | Clarke |

(Continued)

FOREIGN PATENT DOCUMENTS

| JP | 57-135911 A | 8/1982 |
| JP | 58-46312 A | 3/1983 |

(Continued)

OTHER PUBLICATIONS

English Translation of International Search Report from International Patent Application No. PCT/JP2015/000090, dated Mar. 31, 2015.

(Continued)

*Primary Examiner* — Joseph P Martinez
(74) *Attorney, Agent, or Firm* — Shapiro, Gabor and Rosenberger, PLLC

(57) ABSTRACT

An imaging lens (PL) has an image surface (I) curved to have a concave surface facing an object and comprises, in order from the object along the optical axis (Ax): a first lens (L1) having positive refractive power; a second lens (L2) having negative refractive power; a third lens (L3) having positive refractive power; a fourth lens (L4) having positive or negative refractive power; and a fifth lens (L5) having at least one lens surface formed as an aspherical surface and having negative refractive power. The following conditional expression is satisfied:

$$0.005 < f/|f4| < 0.5$$

where, f denotes a focal length of the imaging lens (PL), and
f4 denotes a focal length of the fourth lens (L4).

10 Claims, 17 Drawing Sheets

(51) Int. Cl.
*G02B 13/18* (2006.01)
*G02B 5/126* (2006.01)
*G02B 13/00* (2006.01)
*H04N 5/232* (2006.01)

(52) U.S. Cl.
CPC .......... *G02B 13/18* (2013.01); *G02B 13/0015* (2013.01); *H04N 5/232* (2013.01)

(56) References Cited

U.S. PATENT DOCUMENTS

| | | | |
|---|---|---|---|
| 4,832,472 A | 5/1989 | Robb | |
| 5,418,647 A | 5/1995 | Ishisaka | |
| 5,850,312 A | 12/1998 | Kato et al. | |
| 6,088,172 A | 7/2000 | Sato | |
| 6,529,336 B1 | 3/2003 | Kreitzer | |
| 7,864,454 B1* | 1/2011 | Tang | G02B 13/0045 359/714 |
| 9,453,986 B2 | 9/2016 | Ishihara | |
| 9,496,301 B2 | 11/2016 | Baba | |
| 9,557,528 B2 | 1/2017 | Sano | |
| 2003/0142412 A1* | 7/2003 | Shirasuna | G02B 15/173 359/690 |
| 2007/0236811 A1 | 10/2007 | Mori | |
| 2012/0162769 A1 | 6/2012 | Suzuki et al. | |
| 2013/0321932 A1 | 12/2013 | Hsu et al. | |
| 2014/0029116 A1 | 1/2014 | Tsai et al. | |
| 2014/0104707 A1 | 4/2014 | Nakamura et al. | |
| 2014/0139711 A1 | 5/2014 | Sano | |
| 2015/0077619 A1 | 3/2015 | Yamano | |
| 2015/0358516 A1 | 12/2015 | Baba | |
| 2018/0045921 A1 | 2/2018 | Kumazawa et al. | |

FOREIGN PATENT DOCUMENTS

| | | |
|---|---|---|
| JP | 63-292106 A | 11/1988 |
| JP | 05-188292 A | 7/1993 |
| JP | 07-120677 A | 5/1995 |
| JP | 11-153752 A | 6/1999 |
| JP | 2000-66095 A | 3/2000 |
| JP | 2001-356266 A | 12/2001 |
| JP | 2004-312239 A | 11/2004 |
| JP | 2006-184783 A | 7/2006 |
| JP | 2007-279282 A | 10/2007 |
| JP | 2007-298572 A | 11/2007 |
| JP | 2010-008562 A | 1/2010 |
| JP | 2012-141423 A | 7/2012 |
| JP | 2012-230233 A | 11/2012 |
| JP | 2012-237966 A | 12/2012 |
| JP | 2012-252193 A | 12/2012 |
| JP | 2013-024892 A | 2/2013 |
| JP | 2013-025202 A | 2/2013 |
| JP | 2013-061476 A | 4/2013 |
| JP | 2013-210534 A | 10/2013 |
| JP | 2013-210538 A | 10/2013 |
| JP | 2013-210543 A | 10/2013 |
| JP | 2013-210549 A | 10/2013 |
| JP | 2013-228570 A | 11/2013 |
| JP | 5341265 B2 | 11/2013 |
| JP | 2014-178624 A | 9/2014 |
| JP | 2014-211586 A | 11/2014 |
| JP | 5644947 B2 | 12/2014 |
| JP | 2015-001644 A | 1/2015 |
| JP | 2015-022152 A | 2/2015 |
| WO | WO 2013/008862 A1 | 1/2013 |
| WO | WO 2013/015082 A1 | 1/2013 |
| WO | WO 2013/027641 A1 | 2/2013 |
| WO | WO 2014/119402 A1 | 8/2014 |

OTHER PUBLICATIONS

English Translation of Written Opinion of the International Searching Authority from International Patent Application No. PCT/JP2015/000090, dated Mar. 31, 2015.

Office Action from Japanese Patent Application No. 2016-568167, dated Sep. 25, 2018.

International Search Report from International Patent Application No. PCT/JP2015/002313, dated Aug. 4, 2015.

* cited by examiner

IMAGING LENS AND IMAGE CAPTURING DEVICE

RELATED APPLICATIONS

This is a continuation of PCT International Application No. PCT/JP2015/000090, filed on Jan. 9, 2015, which is hereby incorporated by reference.

TECHNICAL FIELD

The present invention relates to an imaging lens usable for an image capturing device embedded in a mobile terminal or the like.

TECHNICAL BACKGROUND

Imaging lenses (see, for example, Patent Document 1) used in small image capturing devices embedded in mobile terminals or the like are required to have high resolving power of about 1 to 2 μm on an imaging surface, due to development of image sensors with increased pixels. The imaging lenses are also required to have a shorter entire length due to ever increasing demand for thinner mobile terminals or the like. The high resolving power may be achieved by an imaging lens having an aspherical lens surface. Thus, almost all the lens surfaces of conventional imaging lenses used in small image capturing devices are aspherical. Another possible solution is to increase the number of lens to achieve the imaging lens with high resolving power. Logically, the increased number of lenses simply leads to a larger space required for the lenses to be inserted, and thus results in a longer length of the entire imaging lens.

PRIOR ARTS LIST

Patent Document

Patent Document 1: WO2013/027641(A1)

SUMMARY

An imaging lens has an image surface curved to have a concave surface facing an object and comprises, in order from the object: a first lens having positive refractive power; a second lens having negative refractive power; a third lens having positive refractive power; a fourth lens having positive or negative refractive power; and a fifth lens having at least one lens surface formed as an aspherical surface and having negative refractive power. The following conditional expression is satisfied.

$$0.005 < f/|f4| < 0.5$$

where, f denotes a focal length of the imaging lens, and f4 denotes a focal length of the fourth lens.

An image capturing device comprises: an imaging lens with which an image of an object is formed on an imaging surface; and an image sensor configured to obtain the image of the object formed on the imaging surface. The imaging surface is curved to have a concave surface facing an object. The imaging lens has an image surface curved along the imaging surface. The imaging lens is the above-described imaging lens.

DESCRIPTION OF THE EMBODIMENTS

Figure 16:
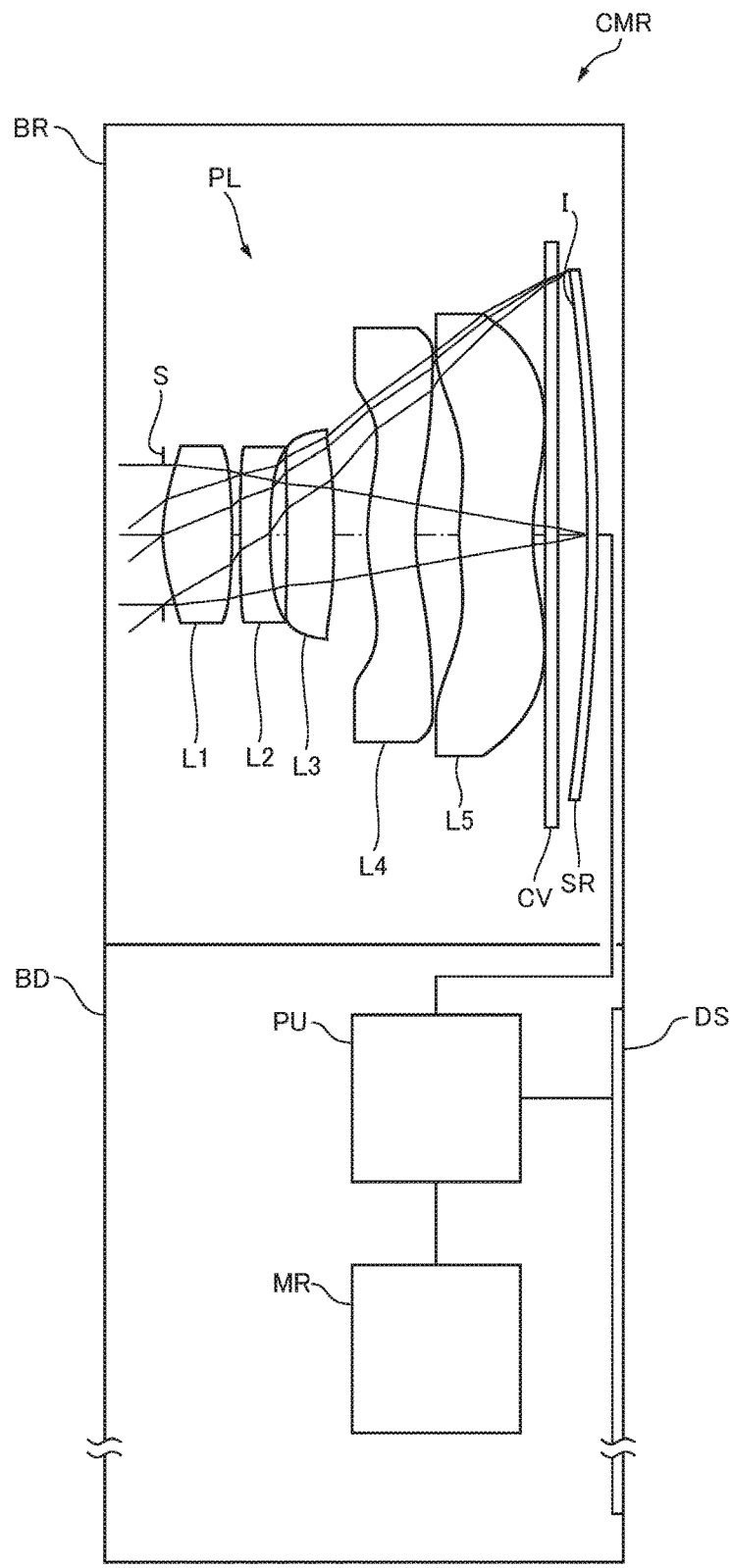
FIG. 16 is a cross-sectional view of an image capturing device.

Preferred embodiments of the present application are described below with reference to the drawings. FIG. 16 illustrates an image capturing device CMR including an imaging lens according to the present application. Specifically, FIG. 16 is a cross-sectional view of the image capturing device CMR embedded in a mobile terminal or the like. The image capturing device CMR mainly includes: a barrel BR provided in a device main body BD of the mobile terminal or the like; an imaging lens PL contained and held in the barrel BR; an image sensor SR contained in the barrel BR; and a control unit PU contained in the device main body BD. With the imaging lens PL, an image of a subject (object) is formed on an imaging surface of the image sensor SR.

The image sensor SR includes an image sensor such as a CCD or a CMOS, and is disposed along an image surface I of the imaging lens PL. The image sensor SR has a surface as an imaging surface on which pixels (photoelectric conversion elements) are two-dimensionally formed. The imaging surface of the image sensor SR is curved to have a concave surface facing the object. The imaging lens PL has the image surface I curved along the imaging surface of the image sensor SR. For example, the image sensor SR has the imaging surface as a spherical concave surface or an aspherical concave surface. The image sensor SR photoelectrically converts light from the subject, focused on the imaging surface with the imaging lens PL, and outputs the resultant image data on the subject to the control unit PU or the like.

The control unit PU is electrically connected to: the image sensor SR; an I/O unit DS provided on an outer side of the device main body BD of the mobile terminal or the like; and a storage unit MR contained in the device main body BD. The I/O unit DS, including a touch panel and a liquid crystal panel, executes processing corresponding to an operation (such as an image capturing operation) of a user, displays the subject image obtained by the image sensor SR, or the other like processing. The storage unit MR stores data required for operations of the image sensor SR or the like, and the image data on the subject obtained by the image sensor SR. The control unit PU controls each of the image sensor SR, the I/O unit DS, the storage unit MR, or the like. The control unit PU can execute various types of image processing on the image data on the subject obtained by the image sensor SR.

Figure 1:
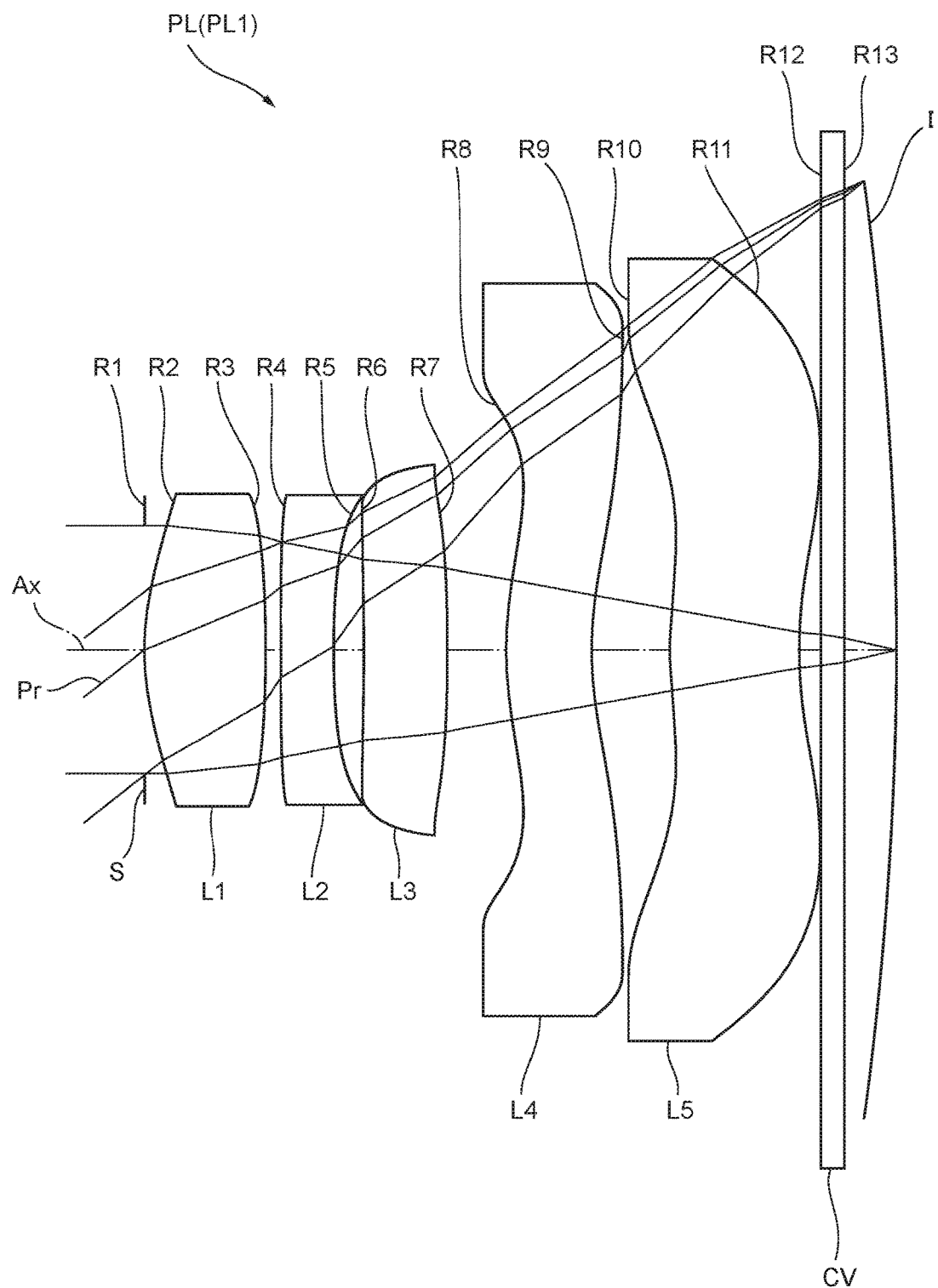
FIG. 1 is a diagram illustrating a lens configuration of an imaging lens according to Example 1.

An imaging lens PL according to the present embodiment is described. For example, as illustrated in FIG. 1, the imaging lens PL according to the present embodiment includes in order from an object: a first lens L1 having positive refractive power; a second lens L2 having negative refractive power; a third lens L3 having positive refractive power; a fourth lens L4 having positive or negative refractive power; and a fifth lens L5 having at least one lens surface formed as an aspherical surface and having negative refractive power, and has an image surface I curved to have a concave surface facing the object. Specifically, the image surface I of the imaging lens PL is curved more largely toward the object, as it gets closer to a peripheral portion from an optical axis Ax. The imaging lens PL having the configuration described above satisfies a condition indicated by the following conditional expression (1).

$$0.005 < f/|f4| < 0.5 \qquad (1)$$

where, f denotes a focal length of the imaging lens PL, and f4 denotes a focal length of the fourth lens L4.

In the present embodiment, the image surface I of the imaging lens PL is curved to have the concave surface facing the object, and thus a load for correcting curvature of field can be reduced. Thus, a favorable imaging performance can be achieved with a smaller number of lenses and thus with a shorter length of the entire imaging lens PL. The conditional expression (1) is for setting an appropriate focal length f4 of the fourth lens L4. With a condition with a value smaller than the upper limit value of the conditional expression (1) set, an absolute value of power of the fourth lens L4 can be prevented from being excessively large, and curvature of field, astigmatic difference, and a coma aberration can be successfully corrected. With a condition with a value larger than the lower limit value of the conditional expression (1) set, the absolute value of power of the fourth lens L4 can be prevented from being excessively small, and a favorable telecentric property can be achieved in a screen peripheral portion.

To guarantee the effects of the present embodiment, the lower limit value of the conditional expression (1) is preferably set to be 0.009. To guarantee the effects of the present embodiment, the upper limit value of the conditional expression (1) is preferably set to be 0.14.

The imaging lens PL having the configuration described above preferably satisfies a condition indicated by the following conditional expression (2).

$$-0.4 < f/f5 < -0.1 \qquad (2)$$

where, f5 denotes a focal length of the fifth lens L5.

The conditional expression (2) is for setting an appropriate focal length f5 of the fifth lens L5. With a condition with a value smaller than the upper limit value of the conditional expression (2) set, negative power of the fifth lens L5 can be prevented from being excessively small, and a favorable telecentric property can be achieved in the screen peripheral portion. With a condition with a value larger than the lower limit value of the conditional expression (2) set, negative power of the fifth lens L5 can be prevented from being excessively large, and curvature of field, astigmatic difference, and a coma aberration can be successfully corrected. The condition with a value larger than the lower limit value of the conditional expression (2) can contribute to a reduction of a length of the entire imaging lens PL.

To guarantee the effects of the present embodiment, the lower limit value of the conditional expression (2) is preferably set to be −0.17. To guarantee the effects of the present embodiment, the upper limit value of the conditional expression (2) is preferably set to be −0.12.

The imaging lens PL having the configuration described above preferably satisfies a condition indicated by the following conditional expression (3).

$$0.03 < f/f3 < 0.25 \qquad (3)$$

where, f3 denotes a focal length of the third lens L3.

The conditional expression (3) is for setting an appropriate focal length f3 of the third lens L3. With a condition with a value smaller than the upper limit value of the conditional expression (3) set, power of the third lens L3 can be prevented from being excessively large, and a spherical aberration, curvature of field, astigmatic difference, and a coma aberration can be successfully corrected. With a condition with a value larger than the lower limit value of the conditional expression (3) set, power of the third lens L3 can be prevented from being excessively small and the length of the entire imaging lens PL can be reduced.

To guarantee the effects of the present embodiment, the lower limit value of the conditional expression (3) is preferably set to be 0.05. To guarantee the effects of the present embodiment, the upper limit value of the conditional expression (3) is preferably set to be 0.125.

The imaging lens PL having the configuration described above preferably satisfies a condition indicated by the following conditional expression (4).

$$0.72 < f/f12 < 0.83 \qquad (4)$$

where, f12 denotes a combined focal length of the first lens L1 and the second lens L2.

The conditional expression (4) is for setting an appropriate combined focal length f12 of the first lens L1 and the second lens L2. With a condition with a value smaller than the upper limit value of the conditional expression (4) set, combined power (1/f12) of the first lens L1 and the second lens L2 can be prevented from being excessively large, and curvature of field can be successfully corrected. Increasing the number of lenses to correct curvature of field leads to a longer length of the entire imaging lens, resulting in an insufficient back focus. With a condition with a value larger than the lower limit value of the conditional expression (4) set, the combined power (1/f12) of the first lens L1 and the second lens L2 can be prevented from being excessively small and the length of the entire imaging lens PL can be reduced.

To guarantee the effects of the present embodiment, the lower limit value of the conditional expression (4) is preferably set to be 0.73. To guarantee the effects of the present embodiment, the upper limit value of the conditional expression (4) is preferably set to be 0.82.

The imaging lens PL having the configuration described above preferably satisfies a condition indicated by the following conditional expression (5).

$$-0.09 < SAG/f12 < -0.02 \qquad (5)$$

where, SAG denotes an amount of curvature of the image surface I in an optical axis direction at a maximum image height, and f12 denotes the combined focal length of the first lens L1 and the second lens L2.

Figure 17:
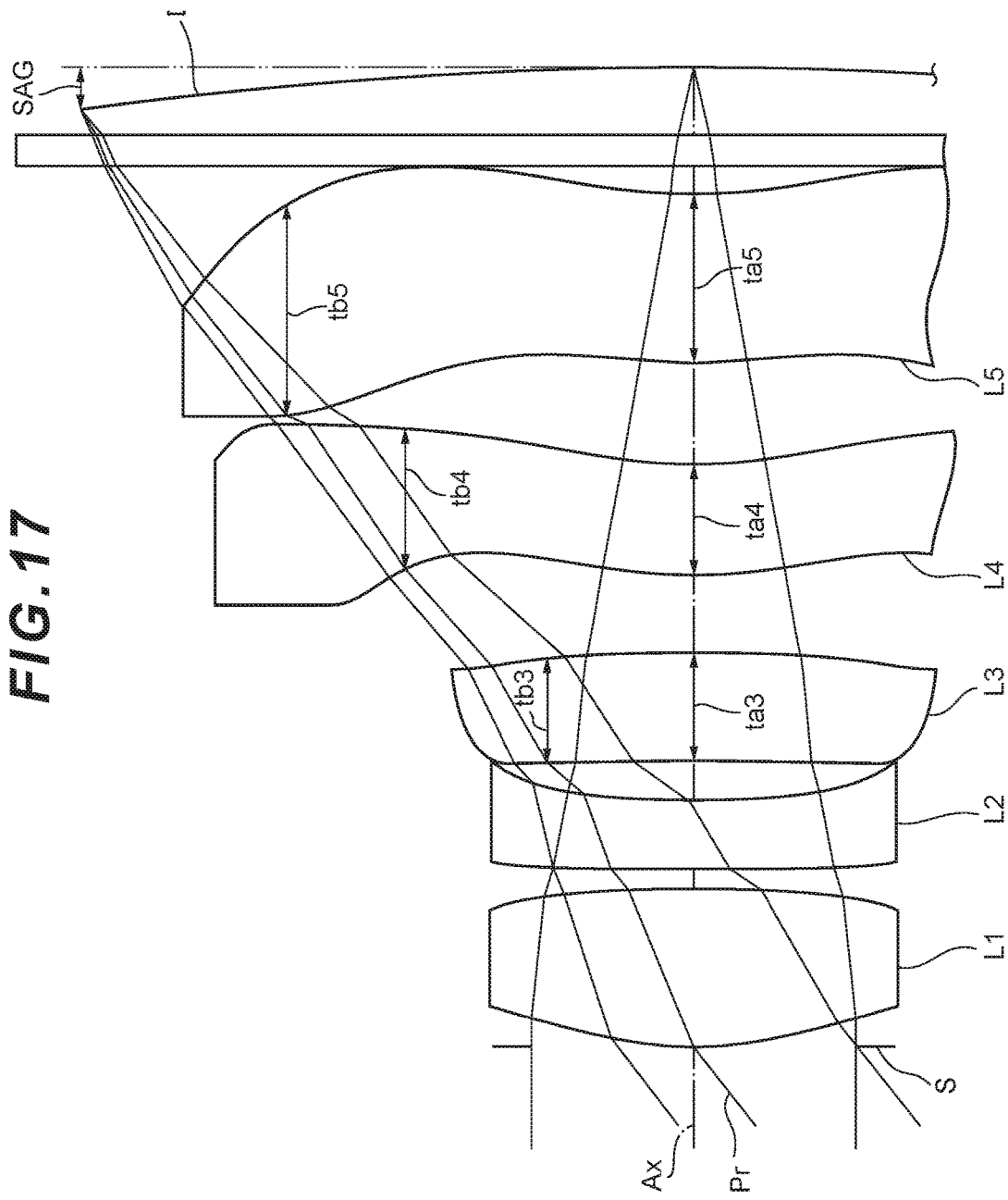
FIG. 17 is an enlarged view of a part of the imaging lens.

The conditional expression (5) is for setting an appropriate range of a relationship between the amount of curvature SAG of the image surface I at the maximum image height in the optical axis direction and the combined power (1/f12) of the first lens L1 and the second lens L2. The amount of curvature SAG of the image surface I at the maximum image height in the optical axis direction is the amount of curvature in the optical axis direction of the image surface I with respect to a tangential plane at a position intersecting with the optical axis Ax, with a direction from the object side toward the image side being a positive direction, as illustrated in FIG. 17. With a condition with a value larger than the lower limit value of the conditional expression (5) set, the combined power (1/f12) of the first lens L1 and the second lens L2 can be prevented from being excessively large, and various aberrations such as a coma aberration can be successfully corrected. Furthermore, the amount of curvature SAG of the image surface I in the optical axis direction (in a negative direction) can be prevented from being excessively large, and long back focus needs not to be set to prevent an interference between the last lens and the image sensor. As a result, the length of the entire imaging lens can be prevented from being long. With a condition with a value smaller than the upper limit value of the conditional expression (5) set, the amount of curvature SAG of the image surface I in the optical axis direction (in the negative direction) can be prevented from being excessively small, and a load on a lens for correcting curvature of field can be reduced, whereby the curvature of field can be successfully corrected. Increasing the number of lenses to correct curvature of field leads to a longer length of the entire imaging lens. Excessively small combined power (1/f12) of the first lens L1 the second lens L2 is unfavorable because it results in a long length of the entire imaging lens.

To guarantee the effects of the present embodiment, the lower limit value of the conditional expression (5) is preferably set to be −0.07. To guarantee the effects of the present embodiment, the upper limit value of the conditional expression (5) is preferably set to be −0.04.

The imaging lens PL having the configuration described above preferably satisfies a condition indicated by the following conditional expression (6).

$$0<(ra+rb)/(ra-rb)<0.8 \quad (6)$$

where, ra denotes a radius of curvature of an object-side lens surface of the second lens L2, and rb denotes a radius of curvature of an image-side lens surface of the second lens L2.

The conditional expression (6) is for setting an appropriate range for a shape factor of the second lens L2. With a condition with a value larger than the lower limit value of the conditional expression (6) set, a principal position of the second lens L2 is shifted toward the image side, whereby a long principal point distance between the first lens L1 and the second lens L2 can be achieved. Thus, the refractive power of the first lens L1 and the second lens L2 can be reduced with the combined focal length of the first lens L1 and the second lens L2 maintained, whereby various aberrations can be prevented. With a condition with a value smaller than the upper limit value of the conditional expression (6) set, a high order aberration such as coma flare due to an increase of a radius of curvature of a lens surface of the second lens L2 on the image side can be prevented.

To guarantee the effects of the present embodiment, the lower limit value of the conditional expression (6) is preferably set to be 0.2. To guarantee the effects of the present embodiment, the upper limit value of the conditional expression (6) is preferably set to be 0.7.

The imaging lens PL having the configuration described above preferably satisfies a condition indicated by the following conditional expression (7).

$$|tb5-ta5|/ta5<0.4 \quad (7)$$

where, ta5 denotes a thickness of the fifth lens L5 in the optical axis direction at a position on the optical axis Ax, and tb5 denotes a thickness of the fifth lens L5 in the optical axis direction at a position with which a principal ray Pr at a maximum angle of view is made incident on an object-side lens surface of the fifth lens L5.

The conditional expression (7) is for setting an appropriate range of a relationship between a thickness of a center portion and a thickness of a peripheral portion of the fifth lens L5. The principal ray Pr passes through the center of an aperture stop S, and the thicknesses ta5 and tb5 of the fifth lens L5 in the optical axis direction are each defined as illustrated in FIG. 17. With a condition with a value smaller than the upper limit value of the conditional expression (7) set, a small difference in the thickness between the center portion and the peripheral portion of the fifth lens L5 can be achieved and thus a ray is not sharply bent in the peripheral portion of the fifth lens L5, whereby curvature of field, astigmatic difference, and a coma aberration can be successfully corrected. The fifth lens L5 with a small difference in the thickness between the center portion and the peripheral portion can be easily manufactured.

To guarantee the effects of the present embodiment, the upper limit value of the conditional expression (7) is preferably set to be 0.35.

The imaging lens PL having the configuration described above preferably satisfies a condition indicated by the following conditional expression (8).

$$0.2<|tb4-ta4|/ta4<2 \quad (8)$$

where, ta4 denotes a thickness of the fourth lens L4 in the optical axis direction at a position on the optical axis Ax, and tb4 denotes a thickness of the fourth lens L4 in the optical axis direction at a position with which the principal ray Pr at a maximum angle of view is made incident on an object-side lens surface of the fourth lens L4.

The conditional expression (8) is for setting an appropriate range of a relationship between a thickness of a center portion and a thickness of a peripheral portion of the fourth lens L4. The principal ray Pr passes through the center of the aperture stop S, and the thicknesses ta4 and tb4 of the fourth lens L4 in the optical axis direction are each defined as illustrated in FIG. 17. With a condition with a value larger than the lower limit value of the conditional expression (8) set, a large difference in the thickness between the center portion and the peripheral portion of the fourth lens L4 is achieved, whereby a small difference in the thickness between the center portion and the peripheral portion of the fifth lens L5 that is likely to be larger than that of the fourth lens L4 can be achieved. Thus, the ray is not sharply bent in the peripheral portion of the fifth lens L5, whereby curvature of field, astigmatic difference, and a coma aberration due to the fifth lens L5 can be successfully corrected. The fifth lens L5 with a small difference in the thickness between the center portion and the peripheral portion can be easily manufactured. With a condition with a value smaller than the upper limit value of the conditional expression (8) set, the difference in the thickness between the center portion and the peripheral portion of the fourth lens L4 can be prevented from being excessively large, whereby curvature of field, astigmatic difference, and a coma aberration can be successfully corrected. The fourth lens L4 with a small difference in the thickness between the center portion and the peripheral portion can be easily manufactured.

To guarantee the effects of the present embodiment, the upper limit value of the conditional expression (8) is preferably set to be 0.31.

The imaging lens PL having the configuration described above preferably satisfies a condition indicated by the following conditional expression (9).

$$|tb3-ta3|/ta3<0.1 \quad (9)$$

where, ta3 denotes a thickness of the third lens L3 in the optical axis direction at a position on the optical axis Ax, and tb3 denotes a thickness of the third lens L3 in the optical axis direction at a position with which the principal ray Pr at a maximum angle of view is made incident on an object-side lens surface of the third lens L3.

The conditional expression (9) is for setting an appropriate range of a relationship between a thickness of a center portion and a thickness of a peripheral portion of the third lens L3. The principal ray Pr passes through the center of the aperture stop S, and the thicknesses ta3 and tb3 of the third lens L3 in the optical axis direction are each defined as illustrated in FIG. 17. With a condition with a value smaller than the upper limit value of the conditional expression (9) set, a small difference in the thickness between the center portion and the peripheral portion of the third lens L3 can be achieved and thus a ray is not sharply bent in the peripheral portion of the third lens L3, whereby a spherical aberration, curvature of field, astigmatic difference, and a coma aberration can be successfully corrected. The third lens L3 with a small difference in the thickness between the center portion and the peripheral portion can be easily manufactured.

To guarantee the effects of the present embodiment, the upper limit value of the conditional expression (9) is preferably set to be 0.05.

In the imaging lens PL having the configuration described above, as illustrated in FIG. 10 for example, a bonded-multilayer diffractive optical element (DOE) may be provided on a lens surface of at least any one of the first lens L1, the second lens L2, the third lens L3, the fourth lens L4, and the fifth lens L5. With such a configuration, a coma chromatic aberration and an on-axis chromatic aberration can be successfully corrected. As described above, the present embodiment can achieve a favorable imaging performance with the entire imaging lens PL having a short length.

In the embodiment described above, the image surface I has a curved shape to have a concave surface facing the object as illustrated in the figures referred to in Examples described below. The curved shape is a spherical shape in terms of manufacturing, but is not limited to the spherical shape, and an aspherical concave surface may be employed.

EXAMPLES

Example 1

Examples according to the present application are described with reference to the drawings. First of all, Example 1 of the present application is described with reference to FIG. 1, FIG. 2 and FIG. 3 and Table 1. FIG. 1 is a diagram illustrating a lens configuration of an imaging lens PL (PL1) according to Example 1. The imaging lens PL1 according to Example 1 includes: a first lens L1 having positive refractive power; a second lens L2 having negative refractive power; a third lens L3 having positive refractive power; a fourth lens L4 having positive refractive power; and a fifth lens L5 having negative refractive power which are disposed in order from the object along the optical axis Ax. The image surface I of the imaging lens PL1 is curved into a spherical shape to have a concave surface facing the object.

Both side lens surfaces of the first lens L1 are aspherical surfaces. An aperture stop S is provided close to the object-side lens surface of the first lens L1. Both side lens surfaces of the second lens L2 are aspherical surfaces. Both side lens surfaces of the third lens L3 are aspherical surfaces. Both side lens surfaces of the fourth lens L4 are aspherical surfaces. Both side lens surfaces of the fifth lens L5 are aspherical surfaces. A parallel flat plate CV, including a cover glass of the image sensor or the like, is disposed between the fifth lens L5 and the image surface I.

Table 1 to Table 5 described below are tables illustrating specification values of imaging lenses according to Example 1 to Example 5. In the tables, [Overall specifications] includes values of the imaging lens PL such as: a focal length f; an F number Fno; half angle of view ω; a maximum image height Y; entire length TL; and a combined focal length f12 of the first lens L1 and the second lens L2. In the tables, [Lens specifications] includes: a first column (surface number) indicating the order of a lens surface from the object; a second column R indicating a curvature of radius of the lens surface; a third column D indicating a distance to the next lens surface on the optical axis; a fourth column nd indicating a refractive index with respect to a d-line (wavelength λ=587.6 nm); and a fifth column vd indicating an Abbe number with respect to the d-line (wavelength λ=587.6 nm). A mark * on the right of the first column (surface number) indicates that the lens surface is an aspherical surface. A radius of curvature "∞" indicates a flat surface, and a refractive index of air nd=1.000000 is omitted. A corresponding value of each conditional expression is written in [Conditional expression corresponding value].

An aspherical coefficient in [Aspherical data] is represented by the following formula (A), where Z denotes a distance (sag) from a lens surface vertex in the optical axis direction, h denotes the distance from the optical axis Ax, c denotes a curvature (reciprocal of the radius of curvature), k denotes a Korenich constant, and An denotes an nth (n=4, 6, 8, 10, 12, or 14) aspherical coefficient. In each Example, a secondary aspherical coefficient A2 is 0, and is omitted. In [Aspherical data] "E-n" represents "×10$^{-n}$".

$$Z=(c\times h^2)/[1+\{1-(1+x)\times c^2\times h^2\}^{1/2}]+A4\times h^4+A6\times h^6+A8\times h^8+A10\times h^{10}+A12\times h^{12}+A14\times h^{14} \quad (A)$$

In Example 5, ** on the right side of the first column (surface number) indicates that the corresponding lens surface is a diffractive surface. A phase shape ψ of the diffractive surface in [Diffractive surface data] according to Example 5 can be represented by the following formula (B) in which h denotes a distance from the optical axis Ax, m denotes a diffraction order, a λ0 denotes a designed wavelength, and Ci denotes an ith (i=2, 4, 6, or 8) phase coefficient. In [Diffractive surface data], "E-n" corresponds to "×10$^{-n}$".

$$\psi(h,m)=\{2\pi/(m\times\lambda 0)\}\times(C2\times h^2+C4\times h^4+C6\times h^6+C8\times h^8) \quad (B)$$

The refractive power φD of the diffractive surface with a certain wavelength λ and a certain diffraction order m can be represented by the following formula (C) with a lowest-order phase coefficient C1.

$$\varphi D(h,m) = -2 \times C1 \times m \times \lambda / \lambda 0 \quad (C)$$

The focal length f, the radius of curvature R and the other units of length described below as the specification values, which are generally described with "mm" unless otherwise noted should not be construed in a limiting sense because the optical system proportionally expanded or reduced can have a similar or the same optical performance. In Example 2 and Example 5 described below, the same reference signs as in this Example are used.

In Table 1 below, specification values in Example 1 are listed. The radii of curvature R of 1st to 13th surfaces in Table 1 respectively correspond to reference numerals R1 to R13 denoting 1st to 13th surfaces in FIG. 1. In Example 1, 2nd to 11th surfaces are aspherical lens surfaces.

TABLE 1

[Overall specifications]

| | | |
|---|---|---|
| f | 7.051 | |
| Fno | 2.4 | |
| ω | 38.1° | |
| Y | 5.6 | |
| TL | 8.903 | |
| f12 | 8.981 | |

[Lens specifications]

| Surface number | R | D | nd | νd |
|---|---|---|---|---|
| Object surface | ∞ | ∞ | | |
| 1 | ∞ | 0.00000 | | (Aperture stop) |
| 2* | 3.68923 | 1.43886 | 1.59240 | 68.37 |
| 3* | −36.94410 | 0.19636 | | |
| 4* | −33.34967 | 0.60000 | 1.63970 | 23.52 |
| 5* | 10.33611 | 0.34797 | | |
| 6* | 31.31246 | 1.00000 | 1.53500 | 55.73 |
| 7* | 439.19530 | 0.71502 | | |
| 8* | 4.32539 | 1.00000 | 1.53500 | 55.73 |
| 9* | 4.02242 | 0.92811 | | |
| 10* | 6.96535 | 1.51985 | 1.53500 | 55.73 |
| 11* | 4.99162 | 0.24795 | | |
| 12 | ∞ | 0.30000 | 1.51680 | 64.17 |
| 13 | ∞ | 0.60925 | | |
| Image surface | −40.44232 | | | |

[Aspherical data]

2nd surface

κ = 0.000000, A4 = −3.570105E−03, A6 = −6.509199E−04, A8 = −3.045907E−04
A10 = 7.803237E−05, A12 = −2.119437E−05, A14 = 0.000000E+00

3rd surface

κ = 0.000000, A4 = −8.739678E−03, A6 = −2.390945E−03, A8 = 1.906287E−03
A10 = −6.049929E−04, A12 = 5.150244E−05, A14 = 0.000000E+00

4th surface

κ = 0.000000, A4 = 5.162563E−03, A6 = −3.555257E−04, A8 = 1.690768E−03
A10 = −3.793957E−04, A12 = 0.000000E+00, A14 = 0.000000E+00

5th surface

κ = 0.000000, A4 = 8.434730E−03, A6 = 2.114749E−03, A8 = −3.203695E−04
A10 = 3.287825E−04, A12 = −3.629021E−05, A14 = 0.000000E+00

6th surface

κ = 0.000000, A4 = −1.214318E−02, A6 = 1.144389E−03, A8 = 6.627417E−05
A10 = −2.533467E−04, A12 = 1.179504E−04, A14 = 0.000000E+00

7th surface

κ = 42915.618794, A4 = −1.923724E−02, A6 = 4.014373E−03
A8 = −8.001482E−04, A10 = 8.280810E−05, A12 = 3.815211E−06
A14 = 0.000000E+00

8th surface

κ = 0.000000, A4 = −2.634284E−02, A6 = 2.957987E−03, A8 = −3.188152E−04
A10 = 5.037687E−06, A12 = 7.182716E−07, A14 = 0.000000E+00

9th surface

κ = −0.912327, A4 = −2.263111E−02, A6 = 3.014090E−03, A8 = −2.934845E−04
A10 = 1.740140E−05, A12 = −4.998079E−07, A14 = 4.163026E−09

TABLE 1-continued

10th surface

κ = 0.000000, A4 = −2.133056E−02, A6 = 8. 968048E−04, A8 = 3. 011621E−05
A10 = −1.972518E−06, A12 = 8.040032E−09, A14 = −6.060932E−11

11th surface

κ = 0.000000, A4 = −2.594604E−08, A6 = 6. 998872E−04, A8 = −2.362809E−05
A10 = −2.594604E−08, A12 = 5.441683E−09, A14 = 1.007655E−10

[Conditional expression corresponding value]

Conditional expression (1) f/|f4| = 0.010
Conditional expression (2) f/f5 = −0.157
Conditional expression (3) f/f3 = 0.112
Conditional expression (4) f/f12 = 0.785
Conditional expression (5) SAG/f12 = −0.043
Conditional expression (6) (ra + rb)/(ra − rb) = 0.53
Conditional expression (7) |tb5 − ta5|/ta5 = 0.26
Conditional expression (8) |tb4 − ta4|/ta4 = 0.28
Conditional expression (9) |tb3 − ta3|/ta3 = 0.04

As described above, the conditional expressions (1) to (9) are all satisfied.

Figure 2:
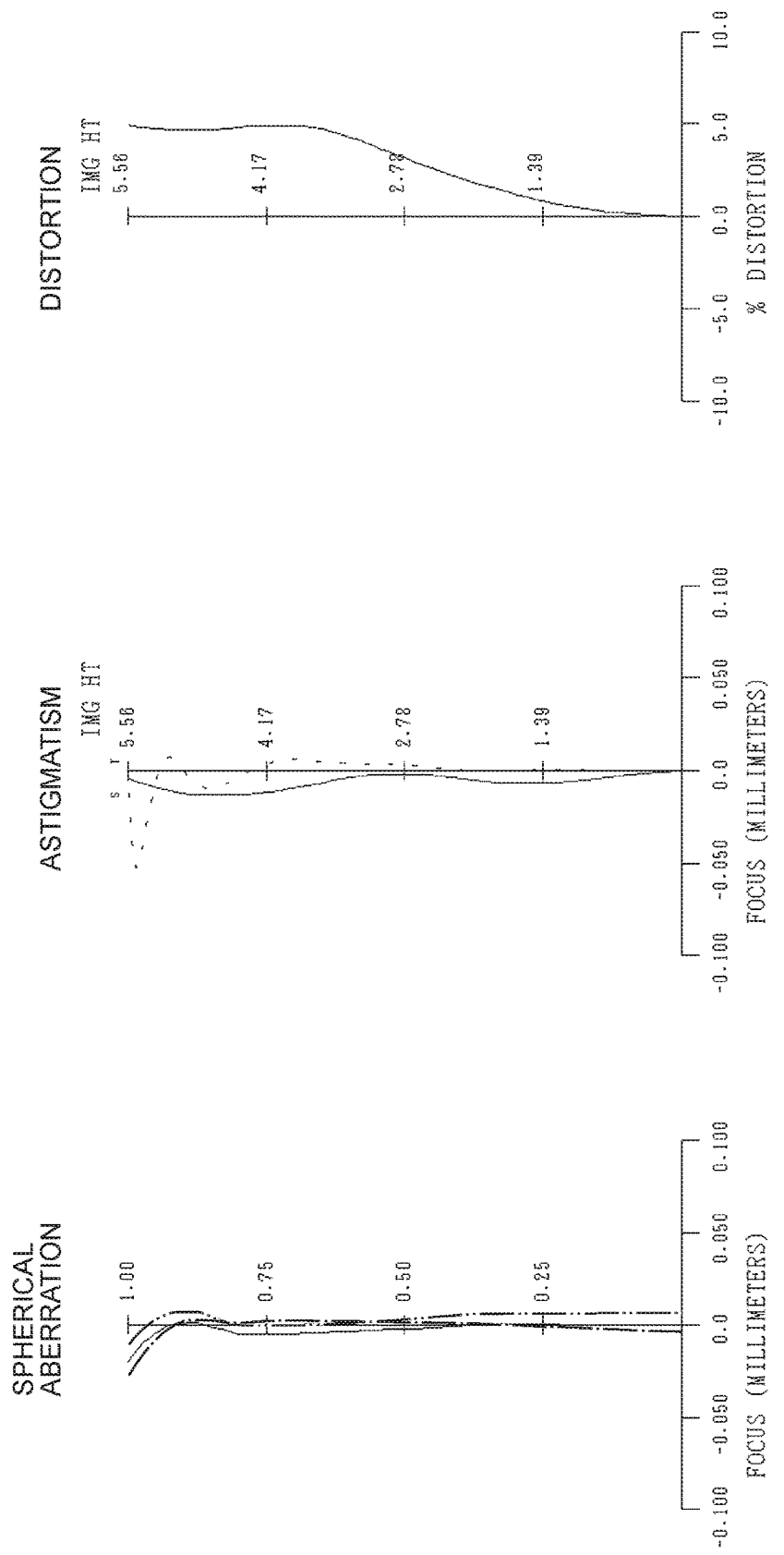
FIG. 2 is graphs illustrating longitudinal aberrations of the imaging lens according to Example 1.
Figure 3:
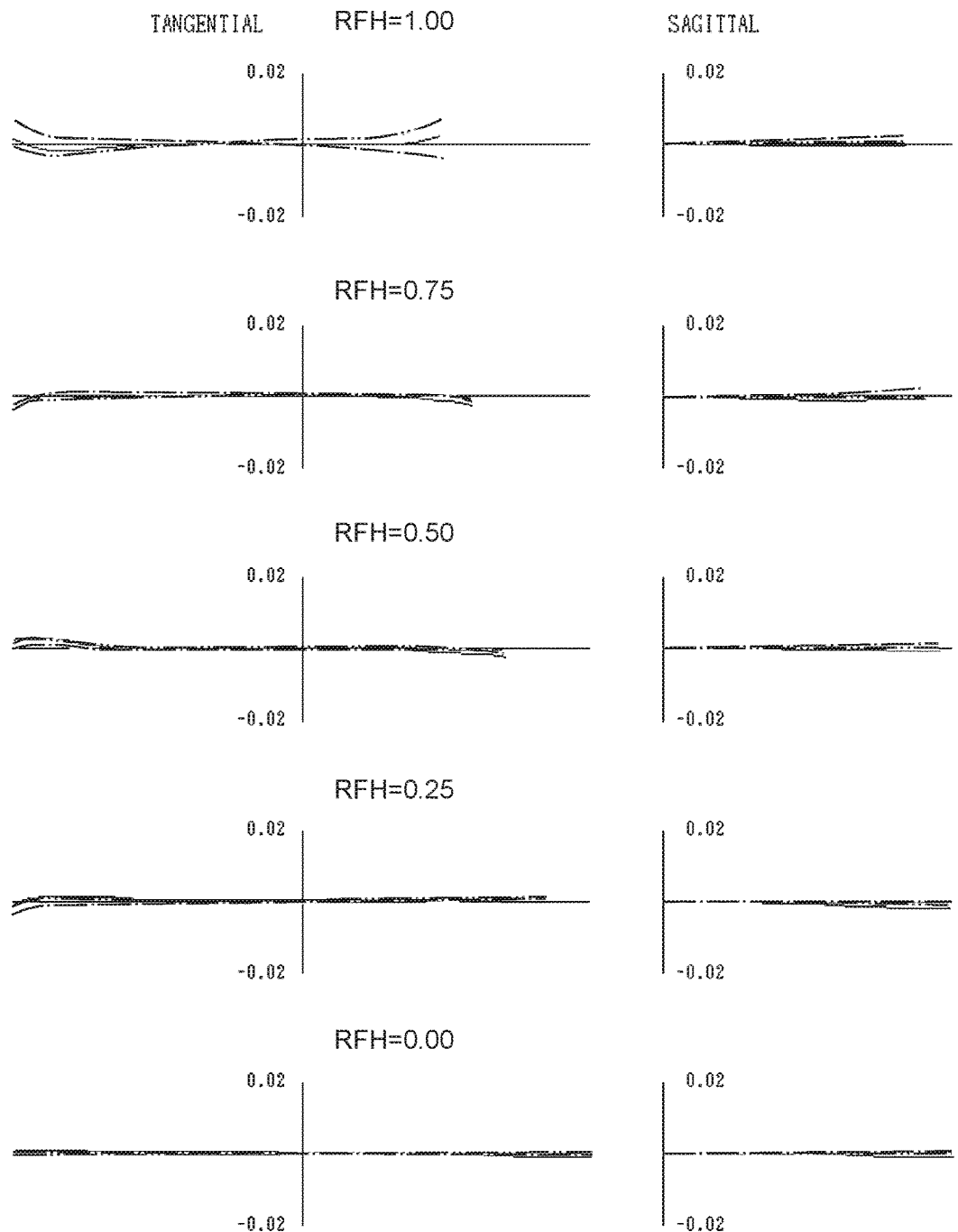
FIG. 3 is graphs illustrating lateral aberrations of the imaging lens according to Example 1.

FIG. 2 is graphs illustrating longitudinal aberrations of the imaging lens PL1 according to Example 1. In an aberration graph illustrating astigmatism in FIG. 2, a solid line represents a sagittal image surface, and a broken line represents a meridional image surface. FIG. 3 is graphs illustrating lateral aberrations of the imaging lens PL1 according to Example 1. In an aberration graph illustrating the coma aberration in FIG. 3, RFH denotes Relative Field Height. The description on the aberration graphs similarly applies to the other Examples.

It can be seen in the aberration graphs that in Example 1, various aberrations are successfully corrected and an excellent imaging performance is achieved. All things considered, the excellent imaging performance of the image capturing device CMR including the imaging lens PL1 according to Example 1 can be guaranteed.

Example 2

Figure 4:
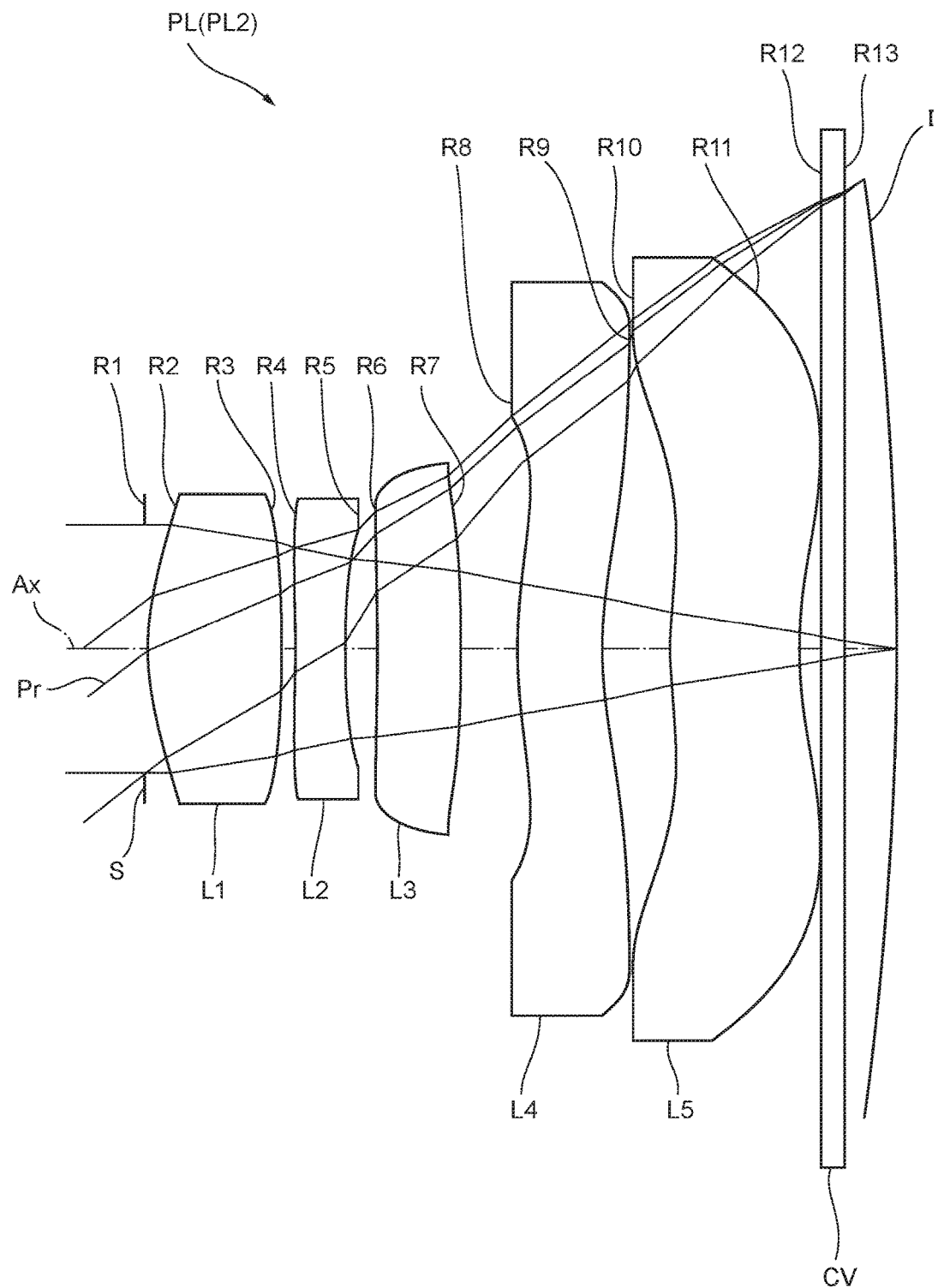
FIG. 4 is a diagram illustrating a lens configuration of an imaging lens according to Example 2.

Next, Example 2 of the present application is described with reference to FIG. 4, FIG. 5 and FIG. 6 and Table 2. FIG. 4 is a diagram illustrating a lens configuration of an imaging lens PL (PL2) according to Example 2. The imaging lens PL2 according to Example 2 includes: a first lens L1 having positive refractive power; a second lens L2 having negative refractive power; a third lens L3 having positive refractive power; a fourth lens L4 having negative refractive power; and a fifth lens L5 having negative refractive power which are disposed in order from the object along the optical axis Ax. The image surface I of the imaging lens PL1 is curved into a spherical shape to have a concave surface facing the object.

Both side lens surfaces of the first lens L1 are aspherical surfaces. An aperture stop S is provided close to the object-side lens surface of the first lens L1. Both side lens surfaces of the second lens L2 are aspherical surfaces. Both side lens surfaces of the third lens L3 are aspherical surfaces. Both side lens surfaces of the fourth lens L4 are aspherical surfaces. Both side lens surfaces of the fifth lens L5 are aspherical surfaces. A parallel flat plate CV, including a cover glass of the image sensor or the like, is disposed between the fifth lens L5 and the image surface I.

In Table 2 below, specification values in Example 2 are listed. The radii of curvature R of 1st to 13th surfaces in Table 2 respectively correspond to reference numerals R1 to R13 denoting 1st to 13th surfaces in FIG. 4. In Example 2, 2nd to 11th surfaces are aspherical lens surfaces.

TABLE 2

[Overall specifications]

| | |
|---|---|
| f | 6.970 |
| Fno | 2.4 |
| ω | 38.2° |
| Y | 5.5 |
| TL | 8.903 |
| f12 | 8.646 |

[Lens specifications]

| Surface number | R | D | nd | vd |
|---|---|---|---|---|
| Object surface | ∞ | ∞ | | |
| 1 | ∞ | 0.00000 | | (Aperture stop) |
| 2* | 3.64658 | 1.62431 | 1.59240 | 68.37 |
| 3* | −30.19768 | 0.14912 | | |
| 4* | −41.49215 | 0.60000 | 1.63970 | 23.52 |
| 5* | 9.41985 | 0.38540 | | |
| 6* | 47.05954 | 1.00000 | 1.53500 | 55.73 |
| 7* | −181.22360 | 0.68159 | | |

TABLE 2-continued

| | | | | |
|---|---|---|---|---|
| 8* | 4.51098 | 1.00000 | 1.53500 | 55.73 |
| 9* | 4.07514 | 0.83248 | | |
| 10* | 6.79073 | 1.54348 | 1.53500 | 55.73 |
| 11* | 5.01645 | 0.24553 | | |
| 12 | ∞ | 0.30000 | 1.51680 | 64.17 |
| 13 | ∞ | 0.54141 | | |
| Image surface | −37.34243 | | | |

[Aspherical data]

2nd surface $\kappa = 0.000000$, A4 = −2.715704E−03, A6 = −4.360297E−04, A8 = −2.517281E−04
A10 = 7.146433E−05, A12 = −1.694820E−05, A14 = 0.000000E+00

3rd surface $\kappa = 0.000000$, A4 = −6.876456E−03, A6 = −2.528722E−03, A8 = 1.948210E−03
A10 = −6.060200E−04, A12 = 5.087436E−05, A14 = 0.000000E+00

4th surface $\kappa = 0.000000$, A4 = 4.956749E−03, A6 = −6.990077E−04, A8 = 1.531199E−03
A10 = −3.432842E−04, A12 = 0.000000E+00, A14 = 0.000000E+00

5th surface $\kappa = 0.000000$, A4 = 8.354094E−03, A6 = 1.951586E−03, A8 = −3.580310E−04
A10 = 2.925723E−04, A12 = −3.104880E−05, A14 = 0.000000E+00

6th surface $\kappa = 0.000000$, A4 = −1.134513E−02, A6 = 1.061209E−03, A8 = 5.873748E−05
A10 = −2.576369E−04, A12 = 1.052375E−04, A14 = 0.000000E+00

7th surface $\kappa = 2913.770247$, A4 = −1.874852E−02, A6 = 3.955280E−03, A8 = −7.931149E−04
A10 = 7.884854E−05, A12 = 3.139011E−06, A14 = 0.000000E+00

8th surface $\kappa = 0.000000$, A4 = −2.583957E−02, A6 = 3.005184E−03, A8 = −3.268004E−04
A10 = 5.828312E−06, A12 = 7.226639E−07, A14 = 0.000000E+00

9th surface $\kappa = -0.955927$, A4 = −2.271887E−02, A6 = 3.014968E−03, A8 = −2.936523E−04
A10 = 1.742106E−05, A12 = −4.976262E−07, A14 = 4.153938E−09

10th surface $\kappa = 0.000000$, A4 = −2.128337E−02, A6 = 8.993966E−04, A8 = 2.960764E−05
A10 = −1.970782E−06, A12 = 8.429869E−09, A14 = −4.985640E−11

11th surface $\kappa = 0.000000$, A4 = −1.427516E−02, A6 = 6.838593E−04, A8 = −2.298530E−05
A10 = −3.124829E−08, A12 = 4.435736E−09, A14 = 1.356162E−10

[Conditional expression corresponding value]

Conditional expression (1) f/|f4| = 0.018
Conditional expression (2) f/f5 = −0.135
Conditional expression (3) f/f3 = 0.100
Conditional expression (4) f/f12 = 0.806
Conditional expression (5) SAG/f12 = −0.047
Conditional expression (6) (ra + rb)/(ra − rb) = 0.63
Conditional expression (7) |tb5 − ta5|/ta5 = 0.22
Conditional expression (8) |tb4 − ta4|/ta4 = 0.31
Conditional expression (9) |tb3 − ta3|/ta3 = 0.04

As described above, the conditional expressions (1) to (9) are all satisfied.

Figure 5:
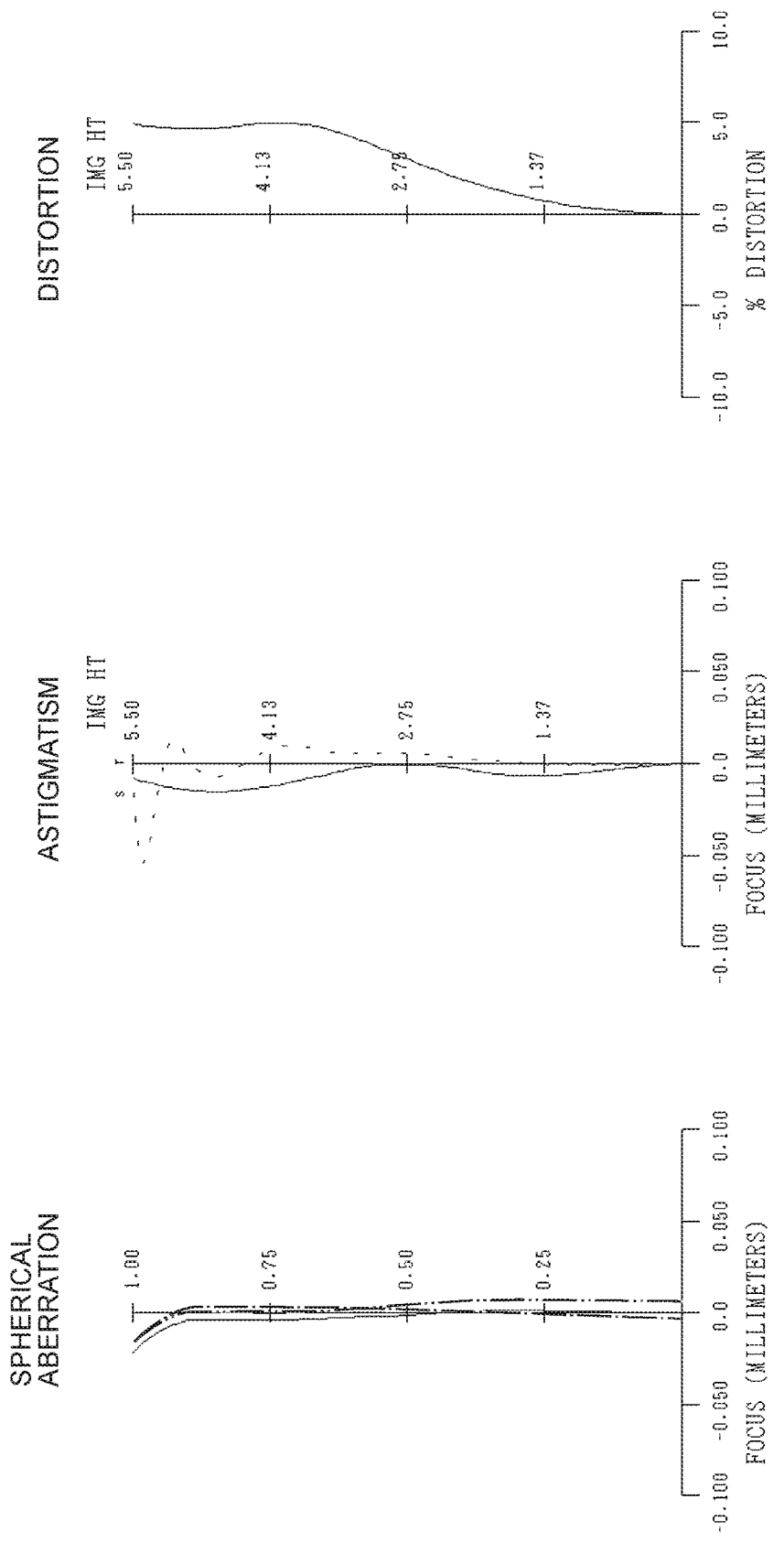
FIG. 5 is graphs illustrating longitudinal aberrations of the imaging lens according to Example 2.
Figure 6:
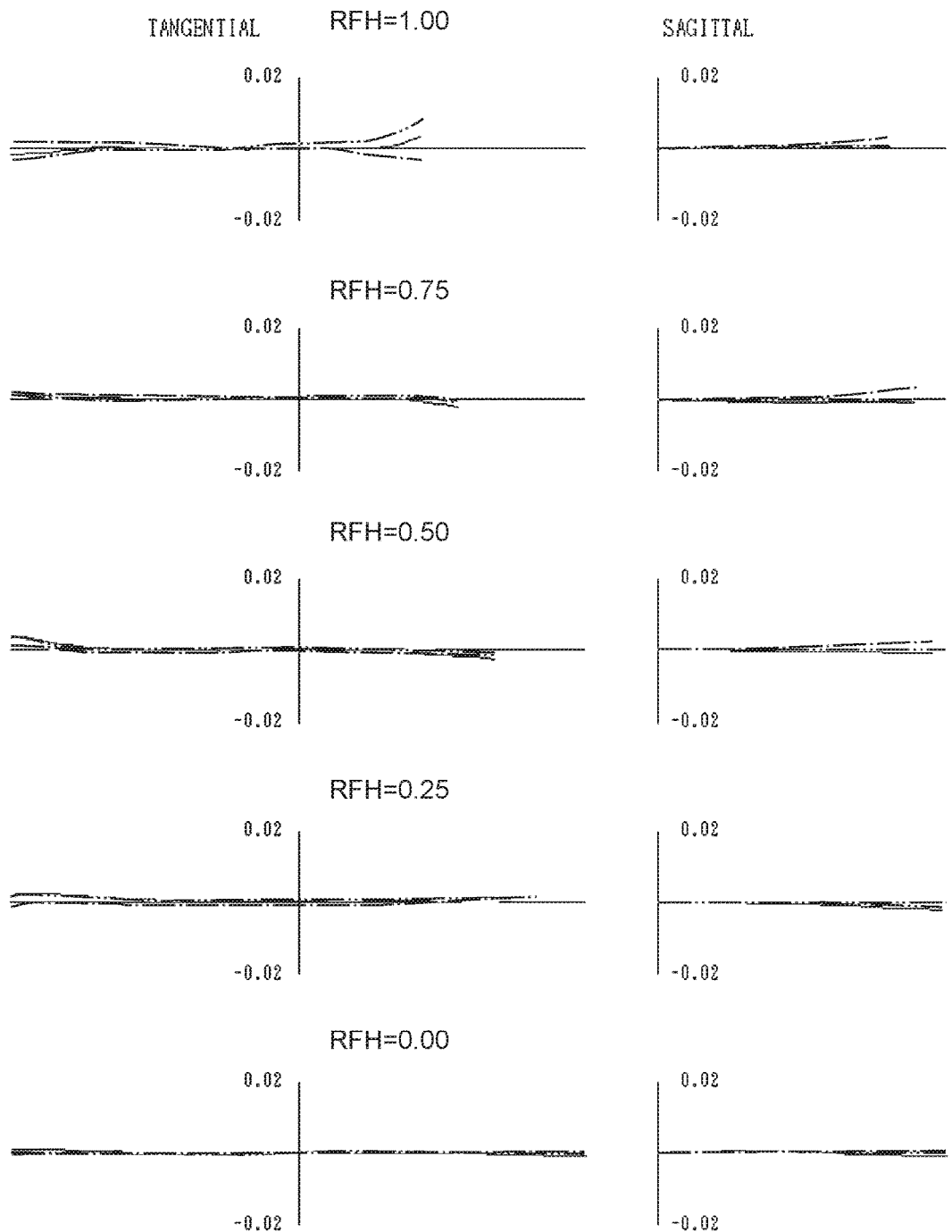
FIG. 6 is graphs illustrating lateral aberrations of the imaging lens according to Example 2.

FIG. 5 is graphs illustrating longitudinal aberrations of the imaging lens PL2 according to Example 2. FIG. 6 is graphs illustrating lateral aberrations of the imaging lens PL2 according to Example 2. It can be seen in the aberration graphs that in Example 2, various aberrations are successfully corrected and an excellent imaging performance is achieved. All things considered, the excellent imaging performance of the image capturing device CMR including the imaging lens PL2 according to Example 2 can be guaranteed.

Example 3

Figure 7:
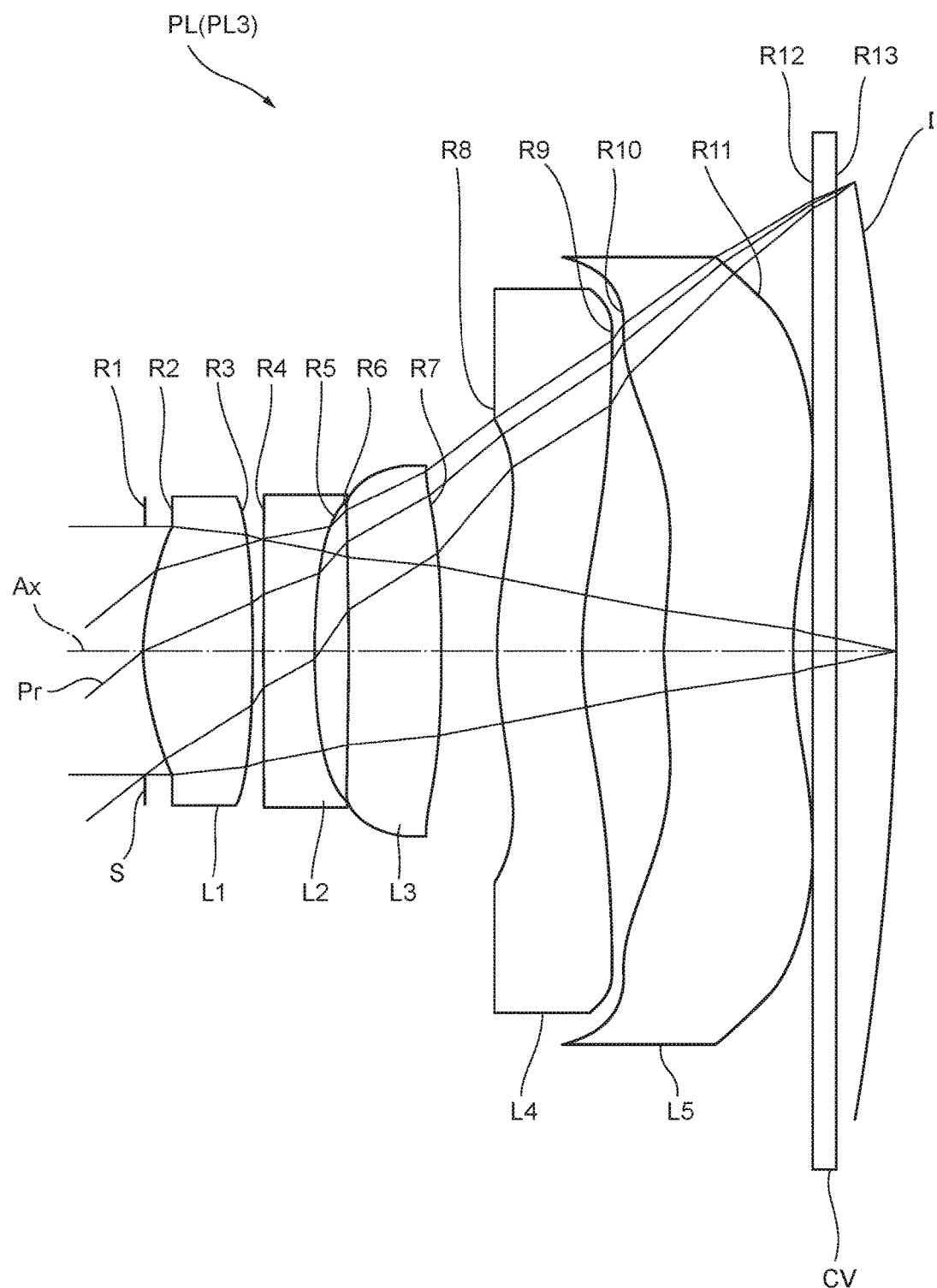
FIG. 7 is a diagram illustrating a lens configuration of an imaging lens according to Example 3.

Next, Example 3 according to the present application is described with reference to FIG. 7, FIG. 8 and FIG. 9 and Table 3. FIG. 7 is a diagram illustrating a lens configuration of an imaging lens PL (PL3) according to Example 3. The imaging lens PL3 according to Example 3 includes: a first lens L1 having positive refractive power; a second lens L2 having negative refractive power; a third lens L3 having positive refractive power; a fourth lens L4 having positive refractive power; and a fifth lens L5 having negative refractive power which are disposed in order from the object along the optical axis Ax. The image surface I of the imaging lens PL1 is curved into a spherical shape to have a concave surface facing the object.

Both side lens surfaces of the first lens L1 are aspherical surfaces. An aperture stop S is provided close to the object-side lens surface of the first lens L1. Both side lens surfaces of the second lens L2 are aspherical surfaces. Both side lens surfaces of the third lens L3 are aspherical surfaces. Both side lens surfaces of the fourth lens L4 are aspherical surfaces. Both side lens surfaces of the fifth lens L5 are aspherical surfaces. A parallel flat plate CV, including a cover glass of the image sensor or the like, is disposed between the fifth lens L5 and the image surface I.

In Table 3 below, specification values in Example 3 are listed. The radii of curvature R of 1st to 13th surfaces in Table 3 respectively correspond to reference numerals R1 to R13 denoting 1st to 13th surfaces in FIG. 7. In Example 3, 2nd to 11th surfaces are aspherical lens surfaces.

TABLE 3

[Overall specifications]

| | |
|---|---|
| f | 7.101 |
| Fno | 2.4 |
| ω | 38.5° |
| Y | 5.6 |
| TL | 8.905 |
| f12 | 9.083 |

[Lens specifications]

| Surface number | R | D | nd | vd |
|---|---|---|---|---|
| Object surface | ∞ | ∞ | | |
| 1 | ∞ | 0.00000 | | (Aperture stop) |
| 2* | 3.24518 | 1.32416 | 1.53500 | 55.73 |
| 3* | −16.18366 | 0.10000 | | |
| 4* | −17.52470 | 0.60000 | 1.63970 | 23.52 |
| 5* | 9.48933 | 0.40329 | | |
| 6* | 36.27256 | 1.09543 | 1.53500 | 55.73 |
| 7* | 448.54174 | 0.64984 | | |
| 8* | 4.32994 | 1.00984 | 1.53500 | 55.73 |
| 9* | 4.17204 | 0.97554 | | |
| 10* | 6.99096 | 1.51991 | 1.53500 | 55.73 |
| 11* | 5.03712 | 0.24904 | | |
| 12 | ∞ | 0.30000 | 1.51680 | 64.17 |
| 13 | ∞ | 0.67790 | | |
| Image surface | −32.46033 | | | |

[Aspherical data]

2nd surface $\kappa = 0.000000$, $A4 = -3.190306\text{E}-03$, $A6 = -8.734789\text{E}-04$, $A8 = -4.006341\text{E}-04$
$A10 = 5.406107\text{E}-05$, $A12 = -3.323754\text{E}-05$, $A14 = 0.000000\text{E}+00$ 3rd surface $\kappa = 0.000000$, $A4 = -8.881360\text{E}-03$, $A6 = -2.713028\text{E}-03$, $A8 = 1.810032\text{E}-03$
$A10 = -6.435194\text{E}-04$, $A12 = 6.024266\text{E}-05$, $A14 = 0.000000\text{E}+00$ 4th surface $\kappa = 0.000000$, $A4 = 4.420451\text{E}-03$, $A6 = -6.041313\text{E}-04$, $A8 = 1.610821\text{E}-03$
$A10 = -3.174168\text{E}-04$, $A12 = 0.000000\text{E}+00$, $A14 = 0.000000\text{E}+00$ 5th surface $\kappa = 0.000000$, $A4 = 8.598132\text{E}-03$, $A6 = 2.178340\text{E}-03$, $A8 = -3.110514\text{E}-04$
$A10 = 3.386680\text{E}-04$, $A12 = -3.255405\text{E}-05$, $A14 = 0.000000\text{E}+00$ 6th surface $\kappa = 0.000000$, $A4 = -1.186747\text{E}-02$, $A6 = 1.115319\text{E}-03$, $A8 = 4.477797\text{E}-05$
$A10 = -2.651464\text{E}-04$, $A12 = 1.114649\text{E}-04$, $A14 = 0.000000\text{E}+00$ 7th surface $\kappa = 42915.618794$, $A4 = -1.971404\text{E}-02$, $A6 = 4.067804\text{E}-03$
$A8 = -8.099559\text{E}-04$, $A10 = 7.672372\text{E}-05$, $A12 = 2.816204\text{E}-06$
$A14 = 0.000000\text{E}+00$ 8th surface $\kappa = 0.000000$, $A4 = -2.637800\text{E}-02$, $A6 = 3.032531\text{E}-03$, $A8 = -3.215881\text{E}-04$
$A10 = 5.048892\text{E}-06$, $A12 = 7.033046\text{E}-07$, $A14 = 0.000000\text{E}+00$ 9th surface $\kappa = -0.766243$, $A4 = -2.231013\text{E}-02$, $A6 = 3.009574\text{E}-03$, $A8 = -2.938002\text{E}-04$
$A10 = 1.738836\text{E}-05$, $A12 = -5.002018\text{E}-07$, $A14 = 4.170065\text{E}-09$ TABLE 3-continued

| 10th surface |
|---|
| κ = 0.000000, A4 = −2.147054E−02, A6 = 8.977322E−04, A8 = 3.041425E−05<br>A10 = −1.960420E−06, A12 = 8.202088E−09, A14 = −8.301703E−11 |
| 11th surface |
| κ = 0.000000, A4 = −1.451709E−02, A6 = 7.214662E−04, A8 = −2.324613E−05<br>A10 = −2.796618E−08, A12 = 5.138298E−09, A14 = 9.081993E−11 |

[Conditional expression corresponding value]

Conditional expression (1) f/|f4| = 0.041
Conditional expression (2) f/f5 = −0.154
Conditional expression (3) f/f3 = 0.096
Conditional expression (4) f/f12 = 0.782
Conditional expression (5) SAG/f12 = −0.053
Conditional expression (6) (ra + rb)/(ra − rb) = 0.30
Conditional expression (7) |tb5-ta5|/ta5 = 0.31
Conditional expression (8) |tb4-ta4|/ta4 = 0.24
Conditional expression (9) |tb3-ta3|/ta3 = 0.03

As described above, the conditional expressions (1) to (9) are all satisfied.

Figure 8:
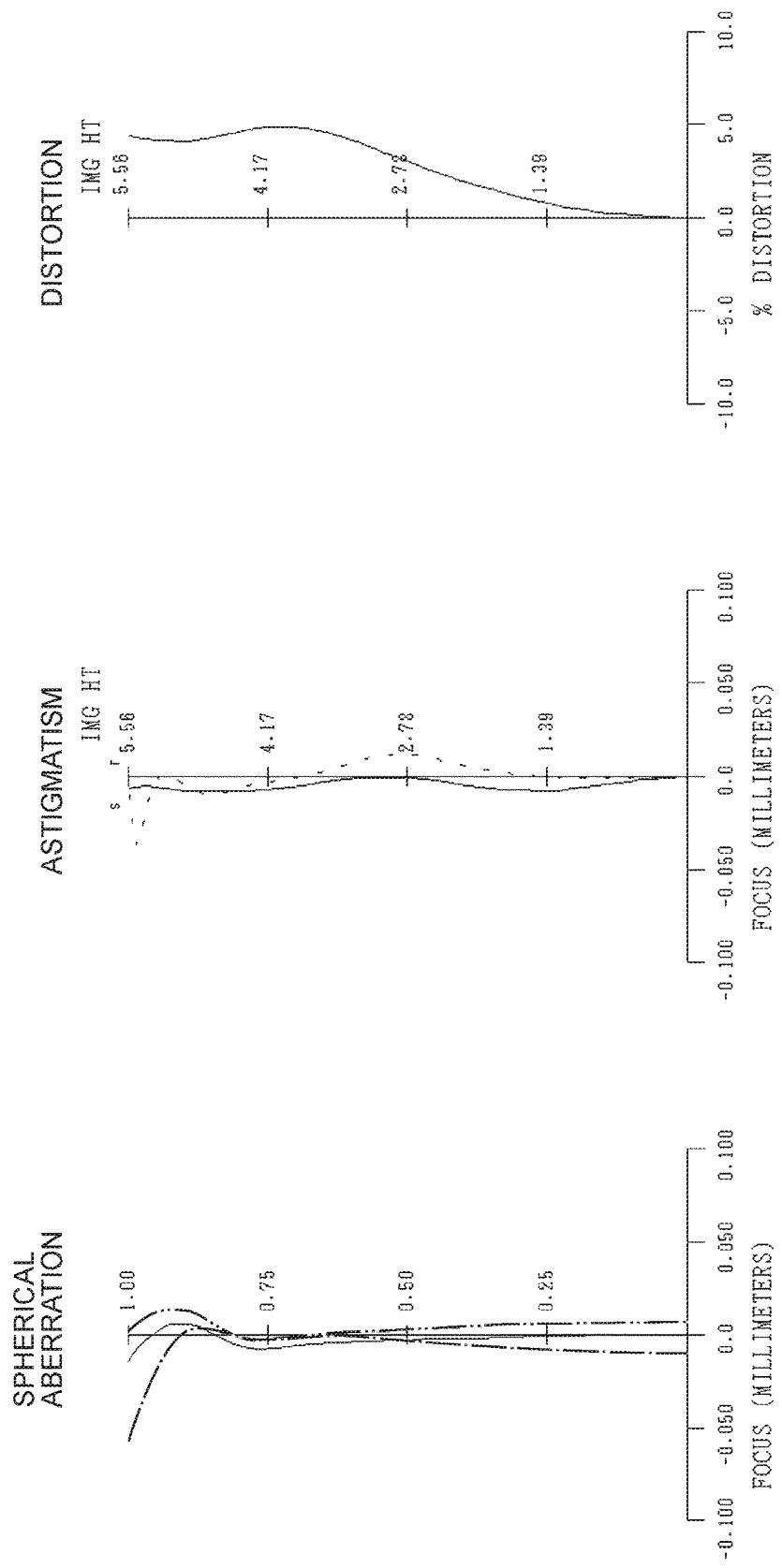
FIG. 8 is graphs illustrating longitudinal aberrations of the imaging lens according to Example 3.
Figure 9:
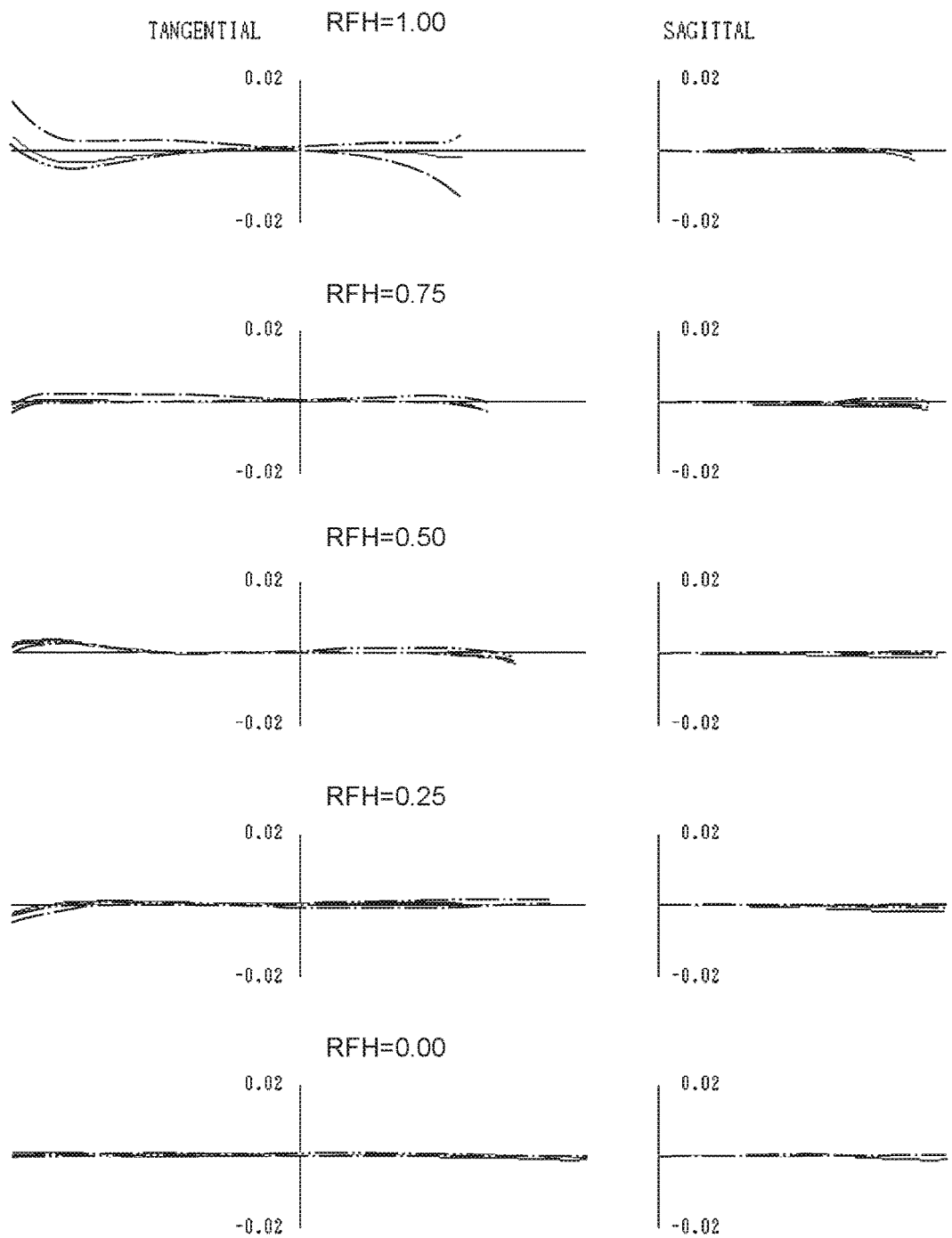
FIG. 9 is graphs illustrating lateral aberrations of the imaging lens according to Example 3.

FIG. 8 is graphs illustrating longitudinal aberrations of the imaging lens PL3 according to Example 3. FIG. 9 is graphs illustrating lateral aberrations of the imaging lens PL3 according to Example 3. It can be seen in the aberration graphs that in Example 3, various aberrations are successfully corrected and an excellent imaging performance is achieved. All things considered, the excellent imaging performance of the image capturing device CMR including the imaging lens PL3 according to Example 3 can be guaranteed.

Example 4

Figure 10:
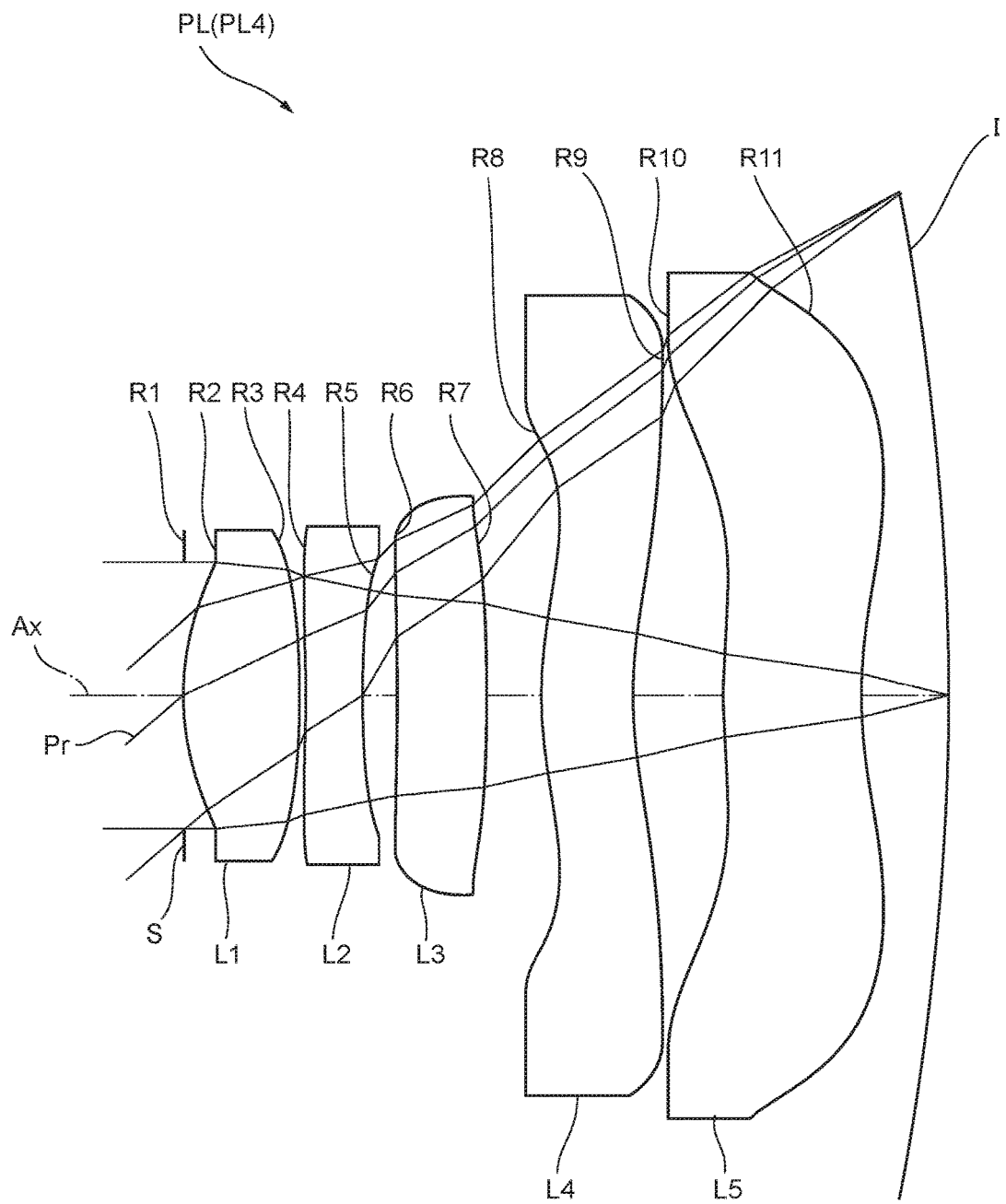
FIG. 10 is a diagram illustrating a lens configuration of an imaging lens according to Example 4.

Next, Example 4 according to the present application is described with reference to FIG. 10, FIG. 11 and FIG. 12 and Table 4. FIG. 10 is a diagram illustrating a lens configuration of an imaging lens PL (PL4) according to Example 4. The imaging lens PL4 according to Example 4 includes: a first lens L1 having positive refractive power; a second lens L2 having negative refractive power; a third lens L3 having positive refractive power; a fourth lens L4 having positive refractive power; and a fifth lens L5 having negative refractive power which are disposed in order from the object along the optical axis Ax. The image surface I of the imaging lens PL1 is curved into a spherical shape to have a concave surface facing the object.

Both side lens surfaces of the first lens L1 are aspherical surfaces. An aperture stop S is provided close to the object-side lens surface of the first lens L1. Both side lens surfaces of the second lens L2 are aspherical surfaces. Both side lens surfaces of the third lens L3 are aspherical surfaces. Both side lens surfaces of the fourth lens L4 are aspherical surfaces. Both side lens surfaces of the fifth lens L5 are aspherical surfaces.

In Table 4 below, specification values in Example 4 are listed. The radii of curvature R of 1st to 11th surfaces in Table 4 respectively correspond to reference numerals R1 to R11 denoting 1st to 11th surfaces in FIG. 10. In Example 4, 2nd to 11th surfaces are aspherical lens surfaces.

TABLE 4

| [Overall specifications] | |
|---|---|
| f | 6.630 |
| Fno | 2.2 |
| ω | 40.4° |
| Y | 5.6 |
| TL | 8.445 |
| f12 | 9.063 |

| [Lens specifications] | | | | |
|---|---|---|---|---|
| Surface number | R | D | nd | vd |
| 1 | ∞ | 0.00000 | | (Aperture stop) |
| 2* | 3.16128 | 1.25910 | 1.53500 | 55.73 |
| 3* | −17.46490 | 0.10000 | | |
| 4* | −23.08917 | 0.60000 | 1.63970 | 23.52 |
| 5* | 8.03860 | 0.39971 | | |
| 6* | 33.47049 | 1.00000 | 1.53500 | 55.73 |
| 7* | 415.97983 | 0.59028 | | |
| 8* | 4.03603 | 1.00000 | 1.53500 | 55.73 |
| 9* | 4.34293 | 0.99615 | | |
| 10* | 6.93635 | 1.54225 | 1.53500 | 55.73 |
| 11* | 4.87208 | | | |
| Image surface | −28.43542 | | | |

TABLE 4-continued

[Aspherical data]

2nd surface

κ = 0.000000, A4 = −3.044112E−03, A6 = −6.657011E−04, A8 = −6.384812E−04
A10 = 1.379670E−04, A12 = −5.876162E−05, A14 = 0.000000E+00

3rd surface

κ = 0.000000, A4 = −8.452881E−03, A6 = −4.126613E−03, A8 = 1.760778E−03
A10 = −5.237809E−04, A12 = 4.403434E−05, A14 = 0.000000E+00

4th surface

κ = 0.000000, A4 = 1.612968E−03, A6 = −1.418453E−03, A8 = 1.322713E−03
A10 = −1.535445E−04, A12 = 0.000000E+00, A14 = 0.000000E+00

5th surface

κ = 0.000000, A4 = 7.136121E−03, A6 = 2.225260E−03, A8 = −4.906232E−04
A10 = 3.506202E−04, A12 = −3.126885E−05, A14 = 0.000000E+00

6th surface

κ = 0.000000, A4 = −1.041022E−02, A6 = 1.341252E−03, A8 = 4.703229E−05
A10 = −2.925072E−04, A12 = 1.040511E−04, A14 = 0.000000E+00

7th surface

κ = 36588.098197, A4 = −2.206946E−02, A6 = 4.964707E−03
A8 = −8.798997E−04, A10 = 6.364621E−05, A12 = 5.903525E−06
A14 = 0.000000E+00

8th surface

κ = 0.000000, A4 = −2.872039E−02, A6 = 3.525770E−03, A8 = −3.783690E−04
A10 = 6.570503E−06, A12 = 7.701422E−07, A14 = 0.000000E+00

9th surface

κ = −0.704637, A4 = −2.186476E−02, A6 = 2.967636E−03, A8 = −2.938684E−04
A10 = 1.738456E−05, A12 = −4.996629E−07, A14 = 4.449369E−09

10th surface

κ = 0.000000, A4 = −2.206083E−02, A6 = 9.031426E−04, A8 = 3.013751E−05
A10 = −1.974726E−06, A12 = 9.623570E−09, A14 = 6.835921E−11

11th surface

κ = 0.000000, A4 = −1.448008E−02, A6 = 6.947833E−04, A8 = −2.448315E−05
A10 = −5.647896E−08, A12 = 5.275035E−09, A14 = 8.315521E−11

[Conditional expression corresponding value]

Conditional expression (1) f/|f4| = 0.133
Conditional expression (2) f/f5 = −0.160
Conditional expression (3) f/f3 = 0.098
Conditional expression (4) f/f12 = 0.732
Conditional expression (5) SAG/f12 = −0.061
Conditional expression (6) (ra + rb)/(ra − rb) = 0.48
Conditional expression (7) |tb5 − ta5|/ta5 = 0.30
Conditional expression (8) |tb4 − ta4|/ta4 = 0.23
Conditional expression (9) |tb3 − ta3|/ta3 = 0.05

As described above, the conditional expressions (1) to (9) are all satisfied.

Figure 11:
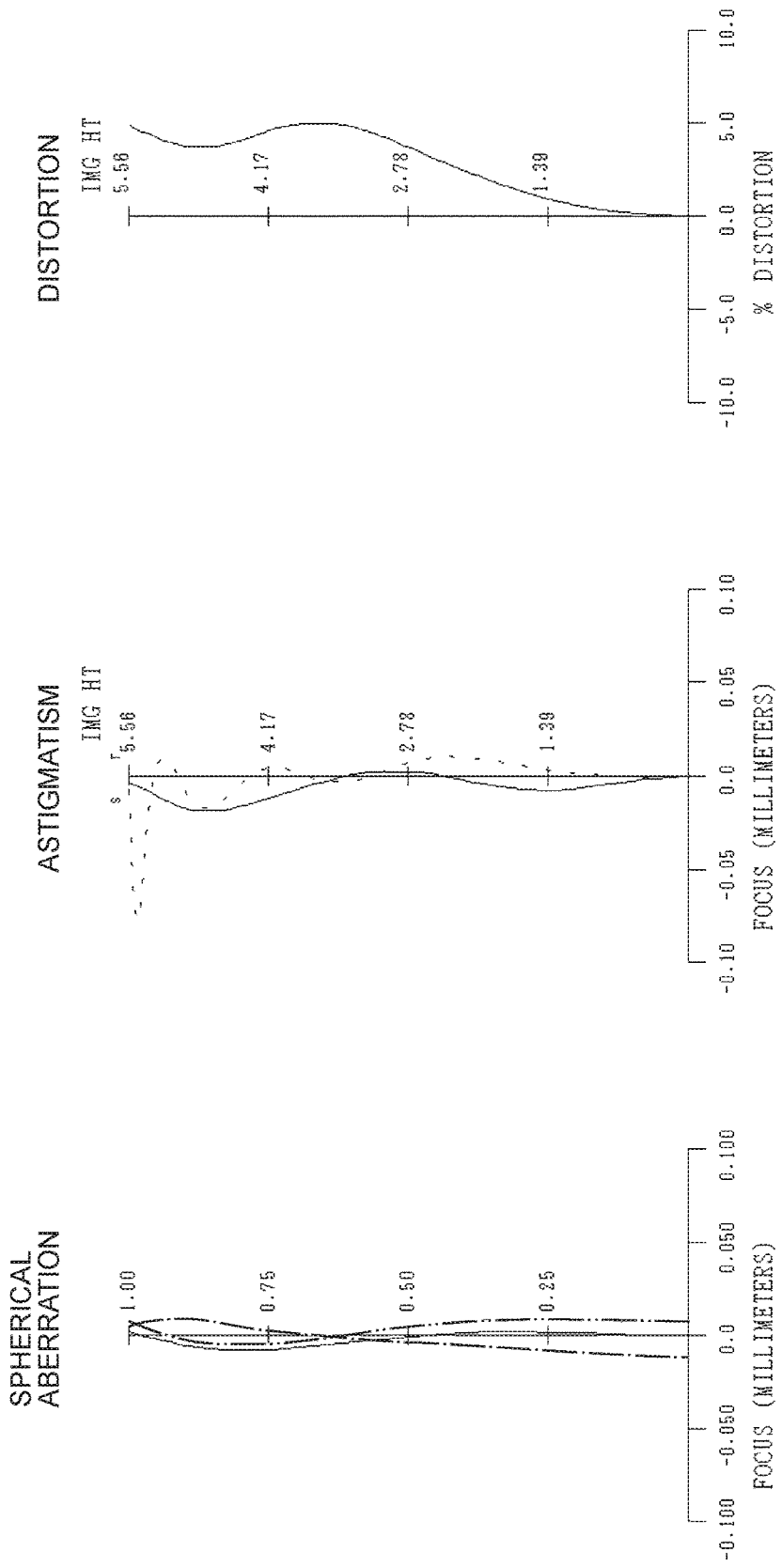
FIG. 11 is graphs illustrating longitudinal aberrations of the imaging lens according to Example 4.
Figure 12:
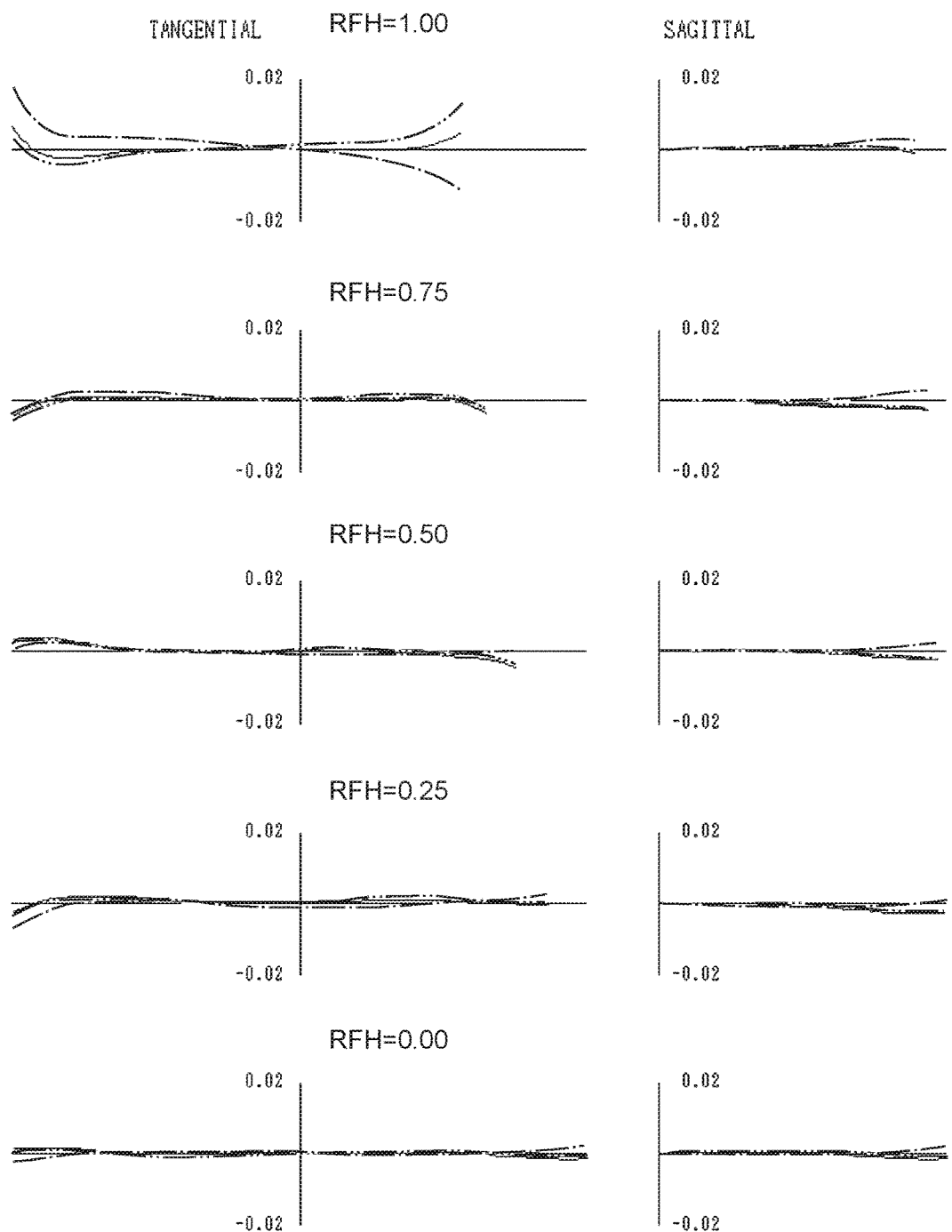
FIG. 12 is graphs illustrating lateral aberrations of the imaging lens according to Example 4.

FIG. 11 is graphs illustrating longitudinal aberrations of the imaging lens PL4 according to Example 4. FIG. 12 is graphs illustrating lateral aberrations of the imaging lens PL4 according to Example 4. It can be seen in the aberration graphs that in Example 4, various aberrations are successfully corrected and an excellent imaging performance is achieved. All things considered, the excellent imaging performance of the image capturing device CMR including the imaging lens PL4 according to Example 4 can be guaranteed.

Example 5

Figure 13:
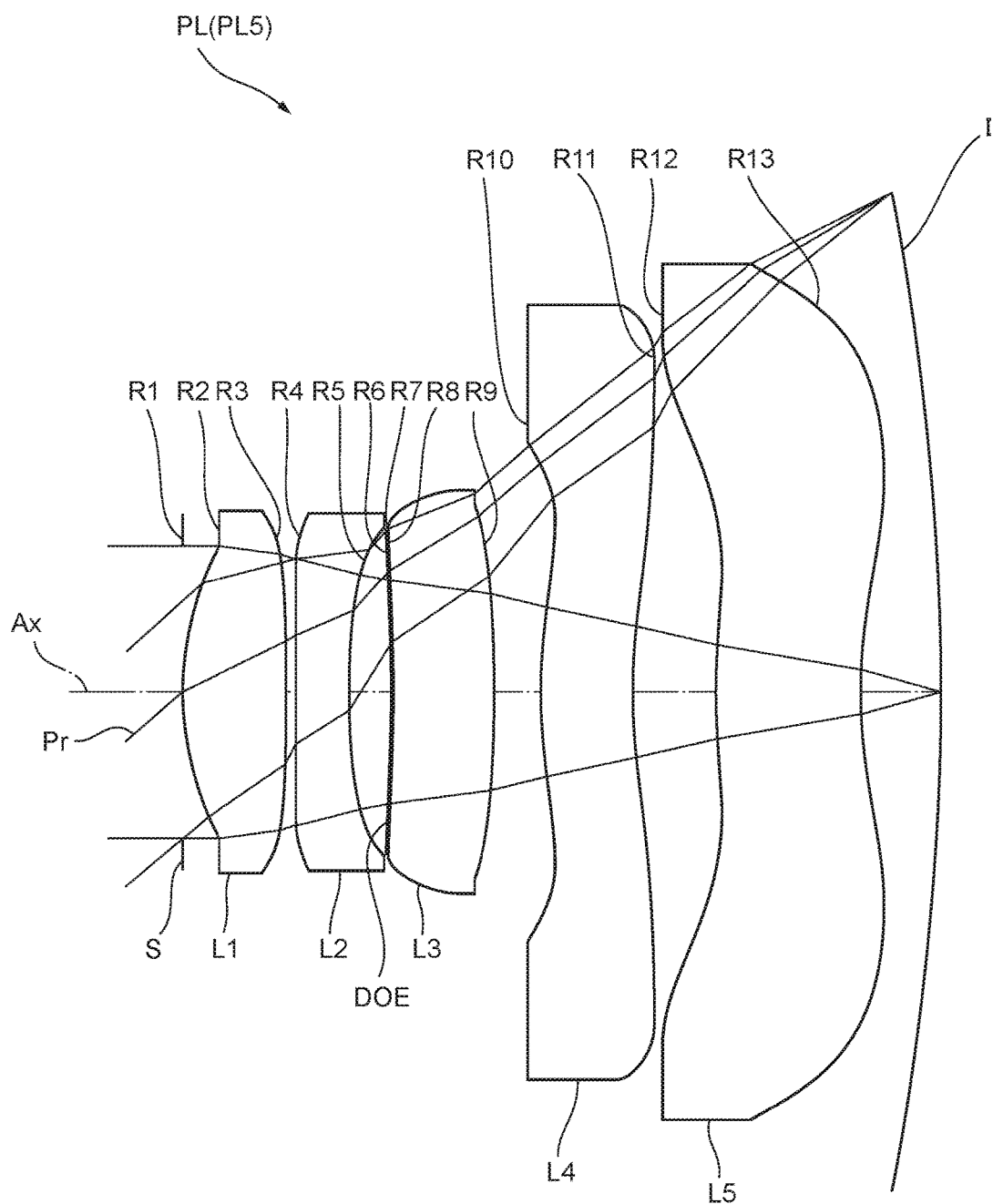
FIG. 13 is a diagram illustrating a lens configuration of an imaging lens according to Example 5.

Next, Example 5 according to the present application is described with reference to FIG. 13, FIG. 14 and FIG. 15 and Table 5. FIG. 13 is a diagram illustrating a lens configuration of an imaging lens PL (PL5) according to Example 5. The imaging lens PL5 according to Example 5 includes: a first lens L1 having positive refractive power; a second lens L2 having negative refractive power; a third lens L3 having positive refractive power; a fourth lens L4 having positive refractive power; and a fifth lens L5 having negative refractive power which are disposed in order from the object along the optical axis Ax. The image surface I of the imaging lens PL1 is curved into a spherical shape to have a concave surface facing the object.

Both side lens surfaces of the first lens L1 are aspherical surfaces. An aperture stop S is provided close to the object-side lens surface of the first lens L1. Both side lens surfaces of the second lens L2 are aspherical surfaces. Both side lens surfaces of the third lens L3 are aspherical surfaces. A bonded-multilayer diffractive optical element (DOE) is provided on an object-side lens surface of the third lens L3. Both side lens surfaces of the fourth lens L4 are aspherical surfaces. Both side lens surfaces of the fifth lens L5 are aspherical surfaces.

In Table 5 below, specification values in Example 5 are listed. The radii of curvature R of 1st to 13th surfaces in Table 5 respectively correspond to reference numerals R1 to R13 denoting 1st to 13th surfaces in FIG. 13. In Example 5, 2nd to 13th surfaces are aspherical lens surfaces. In Example 5, the 7th surface has a lens surface as a diffractive surface.

TABLE 5

| [Overall specifications] | |
|---|---|
| f | 6.514 |
| Fno | 2.0 |
| ω | 40.7° |
| Y | 5.6 |
| TL | 8.442 |
| f12 | 8.404 |

[Lens specifications]

| Surface number | R | D | nd | vd |
|---|---|---|---|---|
| 1 | ∞ | 0.00000 | | (Aperture stop) |
| 2* | 3.10486 | 1.16474 | 1.53500 | 55.73 |
| 3* | −56.70253 | 0.10000 | | |
| 4* | −32.47744 | 0.60000 | 1.63970 | 23.52 |
| 5* | 11.31125 | 0.45881 | | |
| 6* | 87.74058 | 0.01000 | 1.55710 | 49.70 |
| 7** | 87.74058 | 0.01000 | 1.52780 | 33.40 (Diffractive surface) |
| 8* | 87.74058 | 1.12881 | 1.53500 | 55.73 |
| 9* | 439.90364 | 0.52262 | | |
| 10* | 4.44201 | 1.00000 | 1.53500 | 55.73 |
| 11* | 4.66202 | 0.93883 | | |
| 12* | 6.82646 | 1.61399 | 1.53500 | 55.73 |
| 13* | 4.97254 | 0.89436 | | |
| Image surface | −29.46109 | | | |

[Aspherical data]

2nd surface $\kappa = 0.000000$, $A4 = -2.617921E-03$, $A6 = -2.836382E-04$, $A8 = -7.209507E-04$
$A10 = 1.355608E-04$, $A12 = -3.889423E-05$, $A14 = 0.000000E+00$ 3rd surface $\kappa = 0.000000$, $A4 = -6.209105E-03$, $A6 = -3.638046E-03$, $A8 = 1.797303E-03$
$A10 = -4.716609E-04$, $A12 = 3.168969E-05$, $A14 = 0.000000E+00$ 4th surface $\kappa = 0.000000$, $A4 = 3.747415E-03$, $A6 = -6.857342E-04$, $A8 = 1.575670E-03$
$A10 = -2.097313E-04$, $A12 = 0.000000E+00$, $A14 = 0.000000E+00$ 5th surface $\kappa = 0.000000$, $A4 = 6.816408E-03$, $A6 = 2.892403E-03$, $A8 = -4.648327E-04$
$A10 = 3.394889E-04$, $A12 = -1.654776E-05$, $A14 = 0.000000E+00$ 6th surface $\kappa = 0.000000$, $A4 = -1.194834E-02$, $A6 = 1.052826E-03$, $A8 = 8.719881E-07$
$A10 = -2.881473E-04$, $A12 = 1.082776E-04$, $A14 = 0.000000E+00$ 7th surface $\kappa = 0.000000$, $A4 = -1.194834E-02$, $A6 = 1.052826E-03$, $A8 = 8.719881E-07$
$A10 = -2.881473E-04$, $A12 = 1.082776E-04$, $A14 = 0.000000E+00$ 8th surface $\kappa = 0.000000$, $A4 = -1.194834E-02$, $A6 = 1.052826E-03$, $A8 = 8.719881E-07$
$A10 = -2.881473E-04$, $A12 = 1.082776E-04$, $A14 = 0.000000E+00$ 9th surface $k = 39005.261275$, $A4 = -2.356145E-02$, $A6 = 4.845568E-03$
$A8 = -8.795236E-04$, $A10 = 6.491763E-05$, $A12 = 6.304707E-06$
$A14 = 0.000000E+00$ 10th surface $\kappa = 0.000000$, $A4 = -2.949000E-02$, $A6 = 3.600307E-03$, $A8 = -4.070518E-04$
$A10 = 6.785977E-06$, $A12 = 1.032481E-06$, $A14 = 0.000000E+00$ 11th surface $\kappa = -0.758382$, $A4 = -2.197533E-02$, $A6 = 2.987014E-03$, $A8 = -2.920380E-04$
$A10 = 1.739580E-05$, $A12 = -5.029644E-07$, $A14 = 4.165444E-09$ TABLE 5-continued 12th surface κ = 0.000000, A4 = −2.217316E−02, A6 = 9.063406E−04, A8 = 3.009417E−05
A10 = −1.976162E−06, A12 = 9.395528E−09, A14 = 4.181703E−11

13th surface

κ = 0.000000, A4 = −1.425604E−02, A6 = 7.136896E−04, A8 = −2.332945E−05
A10 = −4.444158E−08, A12 = 4.777729E−09, A14 = 1.574126E−11

[Diffractive surface data]

7th surface m = 1
C2 = −1.943400E−03, C4 = 1.987561E−04, C6 = −8.651480E−05
C8 = −1.874098E−05

[Conditional expression corresponding value]

Conditional expression (1) f/|f4| = 0.096
Conditional expression (2) f/f5 = −0.133
Conditional expression (3) f/f3 = 0.059
Conditional expression (4) f/f12 = 0.775
Conditional expression (5) SAG/f12 = −0.063
Conditional expression (6) (ra + rb)/(ra − rb) = 0.48
Conditional expression (7) |tb5 − ta5|/ta5 = 0.34
Conditional expression (8) |tb4 − ta4|/ta4 = 0.27
Conditional expression (9) |tb3 − ta3|/ta3 = 0.03

As described above, the conditional expressions (1) to (9) are all satisfied.

Figure 14:
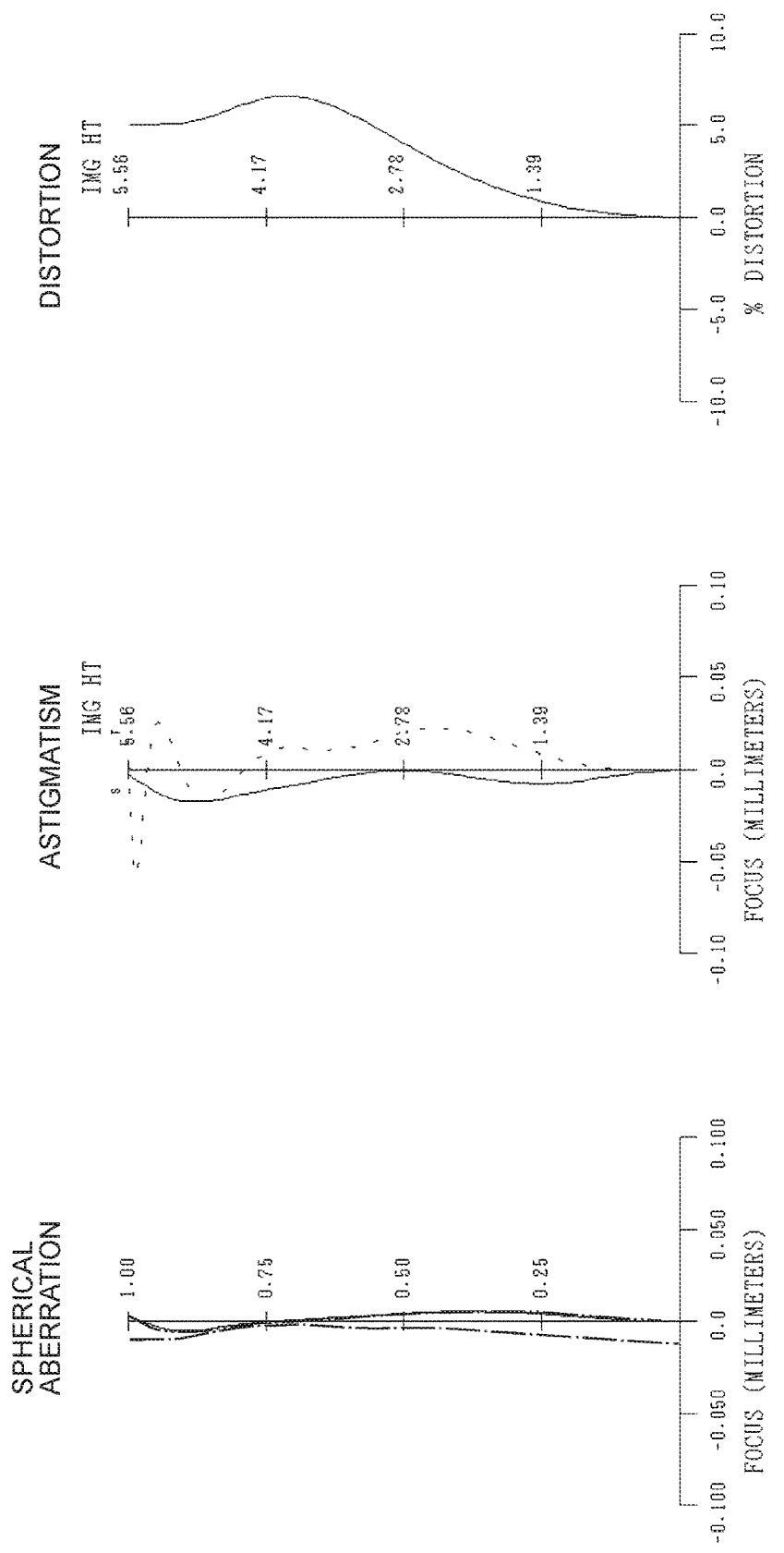
FIG. 14 is graphs illustrating longitudinal aberrations of the imaging lens according to Example 5.
Figure 15:
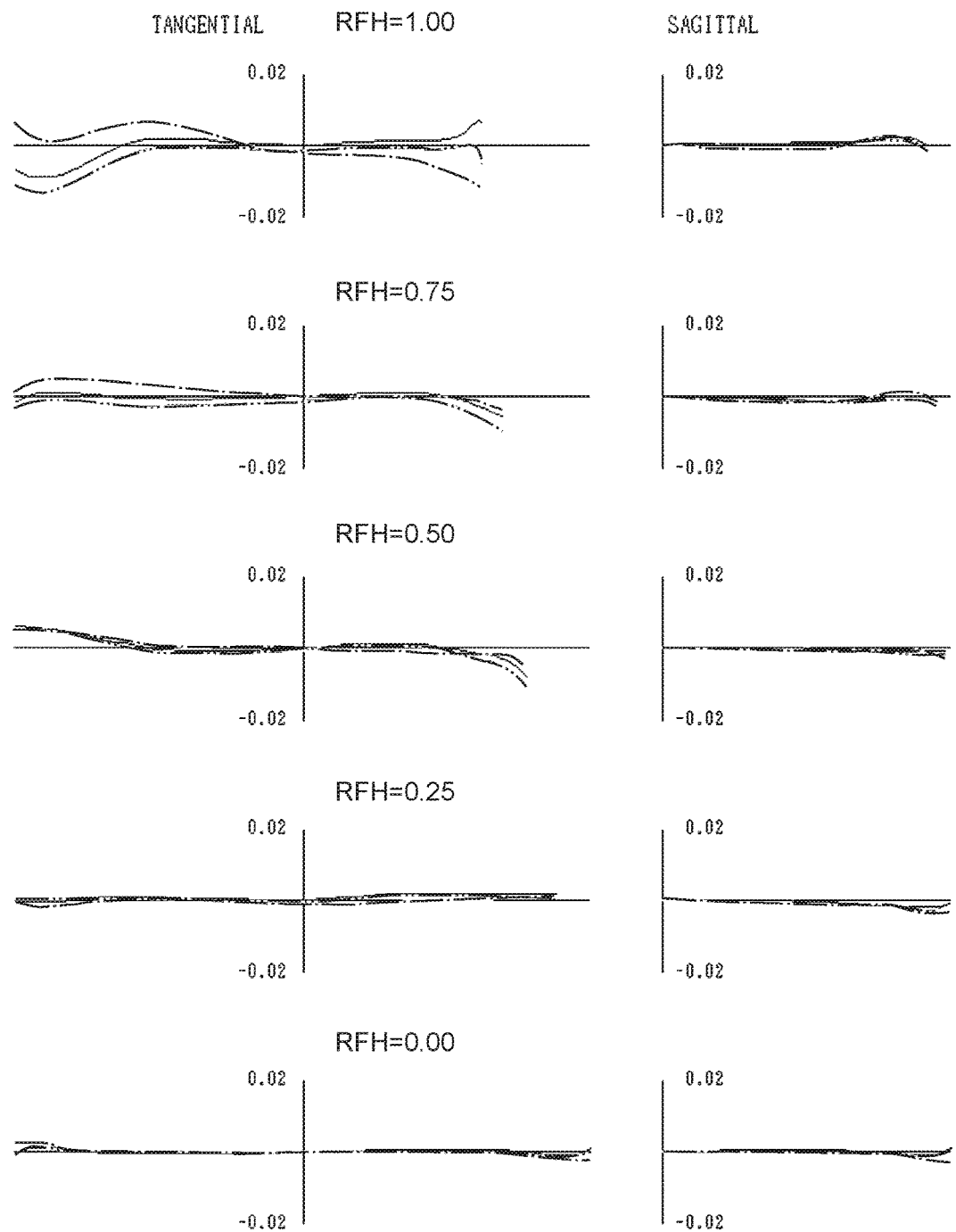
FIG. 15 is graphs illustrating lateral aberrations of the imaging lens according to Example 5.

FIG. 14 is graphs illustrating longitudinal aberrations of the imaging lens PL5 according to Example 5. FIG. 15 is graphs illustrating lateral aberrations of the imaging lens PL5 according to Example 5. It can be seen in the aberration graphs that in Example 5, various aberrations are successfully corrected and an excellent imaging performance is achieved. All things considered, the excellent imaging performance of the image capturing device CMR including the imaging lens PL5 according to Example 5 can be guaranteed.

With Examples described above, an imaging lens having a short entire length and a favorable imaging performance, and an image capturing device including the same can be implemented.

In Examples described above, the image surface I of the imaging lens PL is curved to have a spherical concave surface facing the object. However, this should not be construed in a limiting sense. For example, another curved shape such as an aspherical curved shape may be employed.

In Example 5, the bonded-multilayer diffractive optical element (DOE) is provided on the object-side lens surface of the third lens L3. However, this should not be construed in a limiting sense. The bonded-multilayer diffractive optical element may be provided on at least one of the lens surfaces of the first lens L1, the second lens L2, the fourth lens L4, and the fifth lens L5. The bonded-multilayer diffractive optical element may be provided on at least one of the lens surfaces of the first lens L1, the second lens L2, the third lens L3, the fourth lens L4, and the fifth lens L5 not only in Example 5 described above but also in Example 1 to Example 4 described above.

In Example 1 to Example 3 described above, the parallel flat plate CV is disposed between the fifth lens L5 and the image surface I. However, this should not be construed in a limiting sense. The parallel flat plate CV may not be provided. In Example 4 and Example 5 described above, a parallel flat plate including a cover glass of the image sensor or the like may be disposed between the fifth lens L5 and the image surface I.

In Examples described above, the aperture stop S, disposed close to the first lens L1, is preferably disposed close to an object-side lens surface of the first lens L1 for the sake of aberration correction. The aperture stop may not be provided as a component, and its function may be achieved with a frame of a lens.

EXPLANATION OF NUMERALS AND CHARACTERS

CMR image capturing device
SR image sensor
PL imaging lens
L1 first lens
L2 second lens
L3 third lens
L4 fourth lens
L5 fifth lens
S aperture stop
I image surface
DOE diffractive optical element

The invention claimed is:

1. An imaging lens having an image surface curved to have a concave surface facing an object, the imaging lens comprising, in order from the object:
   a first lens having positive refractive power;
   a second lens having negative refractive power;
   a third lens having positive refractive power;
   a fourth lens having positive or negative refractive power; and
   a fifth lens having at least one lens surface formed as an aspherical surface and having negative refractive power,
   wherein the following conditional expression are satisfied:

$$0.005 < f/|f4| < 0.5$$

$$-0.4 < f/f5 < -0.1, \text{ where}$$

f denotes a focal length of the imaging lens,
f4 denotes a focal length of the fourth lens, and
f5 denotes a focal length of the fifth lens.

2. The imaging lens according to claim 1, wherein the following conditional expression is satisfied:

$$0.03 < f/f3 < 0.25, \text{ where}$$

f3 denotes a focal length of the third lens.

3. The imaging lens according to claim 2, wherein the following conditional expression is satisfied:

$$0.72 < f/f12 < 0.83, \text{ where}$$

f12 denotes a combined focal length of the first lens and the second lens.

4. The imaging lens according to claim 1, wherein the following conditional expression is satisfied:

$$-0.09 < SAG/f12 < -0.02, \text{ where}$$

SAG denotes an amount of curvature of the image surface along an optical axis at a maximum image height, when taking a direction of the optical axis from the object to the image surface as a positive direction, and f12 denotes the combined focal length of the first lens and the second lens.

5. The imaging lens according to claim 1, wherein the following conditional expression is satisfied:

$$0 < (ra+rb)/(ra-rb) < 0.8, \text{ where}$$

ra denotes a radius of curvature of an object-side lens surface of the second lens, and rb denotes a radius of curvature of an image-side lens surface of the second lens.

6. The imaging lens according to claim 1, wherein the following conditional expression is satisfied:

$$|tb5-ta5|/ta5 < 0.4, \text{ where}$$

ta5 denotes a thickness of the fifth lens in an optical axis direction at a position on the optical axis, and tb5 denotes a thickness of the fifth lens in the optical axis direction at a position where a principal ray is incident on an object-side lens surface of the fifth lens at a maximum angle of view.

7. The imaging lens according to claim 1, wherein the following conditional expression is satisfied:

$$0.2 < |tb4-ta4|/ta4 < 2, \text{ where}$$

ta4 denotes a thickness of the fourth lens in an optical axis direction at a position on the optical axis, tb4 denotes a thickness of the fourth lens in the optical axis direction at a position where a principal ray is incident on an object-side lens surface of the fourth lens at a maximum angle of view.

8. The imaging lens according to claim 1, wherein the following conditional expression is satisfied:

$$|tb3-ta3|/ta3 < 0.1, \text{ where}$$

ta3 denotes a thickness of the third lens in an optical axis direction at a position on the optical axis, and tb3 denotes a thickness of the third lens in the optical axis direction at a position where a principal ray is incident on an object-side lens surface of the third lens at a maximum angle of view.

9. The imaging lens according to claim 1, wherein a bonded-multilayer diffractive optical element is provided on at least one lens surface of the first lens, the second lens, the third lens, the fourth lens, and the fifth lens.

10. An image capturing device, comprising:
an imaging lens according to claim 1; and
an image sensor having an imaging surface coincident with the image surface of the imaging lens in a focused state of the imaging lens.

* * * * *